(12) United States Patent
Dubelman et al.

(10) Patent No.: US 12,370,741 B2
(45) Date of Patent: Jul. 29, 2025

(54) MATERIAL DEPOSITION ASSEMBLY FOR ADDITIVE MANUFACTURING

(71) Applicant: General Electric Company, Schenectady, NY (US)

(72) Inventors: Meredith Elissa Dubelman, Liberty Township, OH (US); Christopher David Barnhill, Cincinnati, OH (US); William Joseph Steele, Lawrenceburg, IN (US); Xi Yang, Mason, OH (US)

(73) Assignee: General Electric Company, Evendale, OH (US)

( * ) Notice: Subject to any disclaimer, the term of this patent is extended or adjusted under 35 U.S.C. 154(b) by 179 days.

(21) Appl. No.: 17/883,977

(22) Filed: Aug. 9, 2022

(65) Prior Publication Data

US 2023/0050127 A1 Feb. 16, 2023

Related U.S. Application Data

(60) Provisional application No. 63/232,673, filed on Aug. 13, 2021.

(51) Int. Cl.
*B29C 64/124* (2017.01)
*B29C 64/214* (2017.01)
(Continued)

(52) U.S. Cl.
CPC .......... *B29C 64/124* (2017.08); *B29C 64/214* (2017.08); *B29C 64/223* (2017.08);
(Continued)

(58) Field of Classification Search
CPC ... B29C 64/124; B29C 64/214; B29C 64/223; B29C 64/232; B29C 64/236;
(Continued)

(56) References Cited

U.S. PATENT DOCUMENTS

| 1,990,749 A | 2/1935 | Phillips et al. |
| 2,259,517 A | 10/1941 | Drenkard, Jr. |

(Continued)

FOREIGN PATENT DOCUMENTS

| CN | 101628477 A | 1/2010 |
| CN | 103210344 A | 7/2013 |

(Continued)

OTHER PUBLICATIONS

Admatec, Admaflex 300 Dlp 3D Printer, Specifications, Features, Design and Functions, Netherlands, 2 Pages. Retrieved Nov. 5, 2020 from Webpage: https://admateceurope.com/files/10f1a369c223994 3e650627ba920bd4dd9359078e744369695ab6ffbde75c6c?filename= Admaflex%20300%20brochure.pdf&sig=hQvDlzxkSmFOZwjM.

(Continued)

*Primary Examiner* — Michael M. Robinson
(74) *Attorney, Agent, or Firm* — Dinsmore & Shohl LLP

(57) ABSTRACT

An additive manufacturing apparatus includes a stage configured to hold a component. A radiant energy is device operable to generate and project radiant energy in a patterned image. An actuator is configured to change a position of the stage relative to the radiant energy device. A deposition assembly is upstream of the stage and configured to deposit a resin on a resin support. The deposition assembly includes a reservoir housing configured to retain a volume of resin between the upstream wall and the downstream wall. The deposition assembly also includes an application device operably coupled with the reservoir housing. A computing system is operably coupled with the application device. The computing system is configured to intermittently initiate a flush operation between successive layers of the component, wherein the application device is moved from a first position to a second position during the flush operation.

18 Claims, 20 Drawing Sheets

(51) Int. Cl.

| | |
|---|---|
| *B29C 64/223* | (2017.01) |
| *B29C 64/232* | (2017.01) |
| *B29C 64/236* | (2017.01) |
| *B29C 64/245* | (2017.01) |
| *B29C 64/255* | (2017.01) |
| *B29C 64/268* | (2017.01) |
| *B29C 64/321* | (2017.01) |
| *B29C 64/35* | (2017.01) |
| *B33Y 30/00* | (2015.01) |
| *B33Y 40/00* | (2020.01) |
| *B33Y 50/02* | (2015.01) |
| *B33Y 10/00* | (2015.01) |

(52) U.S. Cl.
CPC .......... *B29C 64/232* (2017.08); *B29C 64/236* (2017.08); *B29C 64/245* (2017.08); *B29C 64/255* (2017.08); *B29C 64/268* (2017.08); *B29C 64/321* (2017.08); *B29C 64/35* (2017.08); *B33Y 30/00* (2014.12); *B33Y 40/00* (2014.12); *B33Y 50/02* (2014.12)

(58) Field of Classification Search
CPC ... B29C 64/245; B29C 64/255; B29C 64/268; B29C 64/321; B29C 64/35; B33Y 10/00; B33Y 30/00; B33Y 40/00
See application file for complete search history.

(56) References Cited

U.S. PATENT DOCUMENTS

| | | |
|---|---|---|
| 3,264,103 A | 8/1966 | Cohen et al. |
| 3,395,014 A | 7/1968 | Cohen et al. |
| 3,486,482 A | 12/1969 | Hunger |
| 3,710,846 A | 1/1973 | Properzi |
| 3,875,067 A | 4/1975 | DeSorgo et al. |
| 3,991,149 A * | 11/1976 | Hurwitt .................. B28B 1/267 264/650 |
| 4,041,476 A | 8/1977 | Swainson |
| 4,292,827 A | 10/1981 | Waugh |
| 4,575,330 A | 3/1986 | Hull |
| 4,752,498 A | 6/1988 | Fudim |
| 4,945,032 A | 7/1990 | Murphy et al. |
| 5,015,312 A | 5/1991 | Kinzie |
| 5,026,146 A | 6/1991 | Hug et al. |
| 5,031,120 A | 7/1991 | Pomerantz et al. |
| 5,058,988 A | 10/1991 | Spence et al. |
| 5,059,021 A | 10/1991 | Spence et al. |
| 5,088,047 A | 2/1992 | Bynum |
| 5,094,935 A | 3/1992 | Vassiliou et al. |
| 5,096,530 A | 3/1992 | Cohen |
| 5,104,592 A | 4/1992 | Hull et al. |
| 5,123,734 A | 6/1992 | Spence et al. |
| 5,126,259 A | 6/1992 | Weiss et al. |
| 5,126,529 A | 6/1992 | Weiss et al. |
| 5,133,987 A | 7/1992 | Spence et al. |
| 5,162,167 A | 11/1992 | Minh et al. |
| 5,174,931 A | 12/1992 | Almquist et al. |
| 5,175,077 A | 12/1992 | Grossa |
| 5,182,055 A | 1/1993 | Allison et al. |
| 5,192,559 A | 3/1993 | Hull et al. |
| 5,203,944 A | 4/1993 | Prinz et al. |
| 5,204,055 A | 4/1993 | Sachs et al. |
| 5,207,371 A | 5/1993 | Prinz et al. |
| 5,236,326 A | 8/1993 | Grossa |
| 5,236,637 A | 8/1993 | Hull |
| 5,236,812 A | 8/1993 | Vassiliou et al. |
| 5,247,180 A | 9/1993 | Mitcham et al. |
| 5,248,456 A | 9/1993 | Evans, Jr. et al. |
| 5,258,146 A | 11/1993 | Almquist et al. |
| 5,314,711 A | 5/1994 | Baccini |
| 5,340,656 A | 8/1994 | Sachs et al. |
| 5,387,380 A | 2/1995 | Cima et al. |
| 5,432,045 A | 7/1995 | Narukawa et al. |
| 5,447,822 A | 9/1995 | Hull et al. |
| 5,454,069 A | 9/1995 | Knapp et al. |
| 5,460,758 A | 10/1995 | Langer et al. |
| 5,496,682 A | 3/1996 | Quadir et al. |
| 5,610,824 A | 3/1997 | Vinson et al. |
| 5,626,919 A | 5/1997 | Chapman et al. |
| 5,650,260 A | 7/1997 | Onishi |
| 5,660,621 A | 8/1997 | Bredt |
| 5,665,401 A | 9/1997 | Serbin et al. |
| 5,688,464 A | 11/1997 | Jacobs et al. |
| 5,693,144 A | 12/1997 | Jacobs et al. |
| 5,697,043 A | 12/1997 | Baskaran et al. |
| 5,717,599 A | 2/1998 | Menhennett et al. |
| 5,718,279 A | 2/1998 | Saoth et al. |
| 5,746,833 A | 5/1998 | Gerhardt |
| 5,764,521 A | 6/1998 | Batchelder et al. |
| 5,807,437 A | 9/1998 | Sachs et al. |
| 5,824,184 A | 10/1998 | Kamijo et al. |
| 5,851,465 A | 12/1998 | Bredt |
| 5,866,058 A | 2/1999 | Batchelder et al. |
| 5,895,547 A | 4/1999 | Kathrein et al. |
| 5,900,207 A | 5/1999 | Danforth et al. |
| 5,939,008 A | 8/1999 | Comb et al. |
| 5,940,674 A | 8/1999 | Sachs et al. |
| 5,945,058 A | 8/1999 | Manners et al. |
| 5,968,561 A | 10/1999 | Batchelder et al. |
| 5,980,813 A | 11/1999 | Narang et al. |
| 5,985,204 A | 11/1999 | Otsuka et al. |
| 6,051,179 A | 4/2000 | Hagenau |
| 6,067,480 A | 5/2000 | Stuffle et al. |
| 6,068,367 A | 5/2000 | Fabbri |
| 6,110,411 A | 8/2000 | Clausen et al. |
| 6,146,567 A | 11/2000 | Sachs et al. |
| 6,193,923 B1 | 2/2001 | Leyden et al. |
| 6,200,646 B1 | 3/2001 | Neckers et al. |
| 6,206,672 B1 | 3/2001 | Grenda |
| 6,363,606 B1 | 4/2002 | Johnson et al. |
| 6,375,451 B1 | 4/2002 | Robinson et al. |
| 6,376,148 B1 | 4/2002 | Liu et al. |
| 6,391,245 B1 | 5/2002 | Smith |
| 6,399,010 B1 | 6/2002 | Guertin et al. |
| 6,401,002 B1 | 6/2002 | Jang et al. |
| 6,403,002 B1 | 6/2002 | van der Geest |
| 6,436,520 B1 | 8/2002 | Yamamoto |
| 6,450,393 B1 | 9/2002 | Doumanidis et al. |
| 6,463,349 B2 | 10/2002 | White et al. |
| 6,471,800 B2 | 10/2002 | Jang et al. |
| 6,500,378 B1 | 12/2002 | Smith |
| 6,512,869 B1 | 1/2003 | Imayama et al. |
| 6,543,506 B1 | 4/2003 | Phillips |
| 6,575,218 B1 | 6/2003 | Burns et al. |
| 6,596,224 B1 | 7/2003 | Sachs et al. |
| 6,641,897 B2 | 11/2003 | Gervasi |
| 6,649,113 B1 | 11/2003 | Manners et al. |
| 6,660,209 B2 | 12/2003 | Leyden et al. |
| 6,668,892 B2 | 12/2003 | Vasilakes et al. |
| 6,682,598 B1 | 1/2004 | Steinmueller et al. |
| 6,780,368 B2 | 8/2004 | Liu et al. |
| 6,786,711 B2 | 9/2004 | Koch et al. |
| 6,838,035 B1 | 1/2005 | Ederer et al. |
| 6,850,334 B1 | 2/2005 | Gothait |
| 6,852,272 B2 | 2/2005 | Artz et al. |
| 6,896,839 B2 | 5/2005 | Kubo et al. |
| 6,914,406 B1 | 7/2005 | Wilkes et al. |
| 6,930,144 B2 | 8/2005 | Oriakhi |
| 6,947,058 B1 | 9/2005 | Elmquist |
| 6,966,960 B2 | 11/2005 | Boyd et al. |
| 6,974,521 B2 | 12/2005 | Schermer |
| 6,986,654 B2 | 1/2006 | Imiolek et al. |
| 7,008,209 B2 | 3/2006 | Iskra et al. |
| 7,016,738 B1 | 3/2006 | Karunasiri |
| 7,022,207 B2 | 4/2006 | Hirsch |
| 7,045,738 B1 | 5/2006 | Kovacevic et al. |
| 7,052,263 B2 | 5/2006 | John |
| 7,070,250 B2 | 7/2006 | Lester et al. |
| 7,074,029 B2 | 7/2006 | Stockwell et al. |
| 7,084,875 B2 | 8/2006 | Plante |
| 7,087,109 B2 | 8/2006 | Bredr et al. |
| 7,158,849 B2 | 1/2007 | Huang et al. |

(56) References Cited

U.S. PATENT DOCUMENTS

| | | |
|---|---|---|
| 7,164,420 B2 | 1/2007 | Ard |
| 7,195,472 B2 | 3/2007 | John |
| 7,261,542 B2 | 8/2007 | Hickerson et al. |
| 7,270,528 B2 | 9/2007 | Sherwood |
| 7,300,613 B2 | 11/2007 | Sano et al. |
| 7,351,304 B2 | 4/2008 | Liang et al. |
| 7,402,219 B2 | 7/2008 | Graf |
| 7,438,846 B2 | 10/2008 | John |
| 7,455,804 B2 | 11/2008 | Patel et al. |
| 7,520,740 B2 | 4/2009 | Wahlstrom et al. |
| 7,550,518 B2 | 6/2009 | Bredt et al. |
| 7,555,726 B2 | 6/2009 | Kurtenbach et al. |
| 7,569,174 B2 | 8/2009 | Ruatta et al. |
| 7,572,403 B2 | 8/2009 | Gu et al. |
| 7,575,682 B2 | 8/2009 | Olsta et al. |
| 7,578,958 B2 | 8/2009 | Patel et al. |
| 7,614,866 B2 | 11/2009 | Sperry et al. |
| 7,614,886 B2 | 11/2009 | Sperry et al. |
| 7,636,610 B2 | 12/2009 | Schillen et al. |
| 7,698,947 B2 | 4/2010 | Sarr |
| 7,706,910 B2 | 4/2010 | Hull et al. |
| 7,742,060 B2 | 6/2010 | Maillot |
| 7,758,799 B2 | 7/2010 | Hull et al. |
| 7,767,132 B2 | 8/2010 | Patel et al. |
| 7,771,183 B2 | 8/2010 | Hull et al. |
| 7,780,429 B2 | 8/2010 | Kikuchi |
| 7,783,371 B2 | 8/2010 | John et al. |
| 7,785,093 B2 | 8/2010 | Holmboe et al. |
| 7,790,093 B2 | 9/2010 | Shkolnik et al. |
| 7,795,349 B2 | 9/2010 | Bredt et al. |
| 7,815,826 B2 | 10/2010 | Serdy et al. |
| 7,845,930 B2 | 12/2010 | Shkolnik et al. |
| 7,867,302 B2 | 1/2011 | Nevoret et al. |
| 7,892,474 B2 | 2/2011 | Shkolnik et al. |
| 7,894,921 B2 | 2/2011 | John et al. |
| 7,931,460 B2 | 4/2011 | Scott et al. |
| 7,962,238 B2 | 6/2011 | Shkolnik et al. |
| 7,964,047 B2 | 6/2011 | Ishida |
| 7,995,073 B1 | 8/2011 | Shemanarev et al. |
| 8,003,040 B2 | 8/2011 | El-Siblani |
| 8,071,055 B2 | 9/2011 | Davidson et al. |
| 8,029,642 B2 | 10/2011 | Hagman |
| 8,048,261 B2 | 11/2011 | McCowin |
| 8,070,473 B2 | 12/2011 | Kozlak |
| 8,105,066 B2 | 1/2012 | Sperry et al. |
| 8,110,135 B2 | 2/2012 | El-Siblani |
| 8,126,580 B2 | 2/2012 | El-Siblani et al. |
| 8,157,908 B2 | 4/2012 | Williams |
| 8,185,229 B2 | 5/2012 | Davidson |
| 8,096,262 B2 | 6/2012 | Ederer et al. |
| 8,191,500 B2 | 6/2012 | Dohring et al. |
| 8,211,226 B2 | 7/2012 | Bredt et al. |
| 8,232,444 B2 | 7/2012 | Bar Nathan et al. |
| 8,259,103 B2 | 9/2012 | Glueck et al. |
| 8,269,767 B2 | 9/2012 | Glueck et al. |
| 8,282,866 B2 | 10/2012 | Hiraide |
| 8,326,024 B2 | 12/2012 | Shkolnik |
| 8,372,330 B2 | 2/2013 | El-Siblani et al. |
| 8,394,313 B2 | 3/2013 | El-Siblani et al. |
| 8,413,578 B2 | 4/2013 | Doyle |
| 8,424,580 B2 | 4/2013 | Anderson et al. |
| 8,444,903 B2 | 5/2013 | Lyons et al. |
| 8,454,879 B2 | 6/2013 | Kuzusako et al. |
| 8,475,946 B1 | 7/2013 | Dion et al. |
| 8,506,862 B2 | 8/2013 | Giller et al. |
| 8,506,870 B2 | 8/2013 | Hochsmann et al. |
| 8,513,562 B2 | 8/2013 | Bichsel |
| 8,522,159 B2 | 8/2013 | Kurtenbach et al. |
| 8,540,501 B2 | 9/2013 | Yasukochi |
| 8,568,646 B2 | 10/2013 | Wang et al. |
| 8,568,649 B1 | 10/2013 | Balistreri et al. |
| 8,593,083 B2 | 11/2013 | Firhoj et al. |
| 8,616,872 B2 | 12/2013 | Matsui et al. |
| 8,623,264 B2 | 1/2014 | Rohner et al. |
| 8,636,494 B2 | 1/2014 | Gothait et al. |
| 8,636,496 B2 | 1/2014 | Das et al. |
| 8,658,076 B2 | 2/2014 | El-Siblani |
| 8,663,568 B2 | 3/2014 | Bar Nathan et al. |
| 8,666,142 B2 | 3/2014 | Shkolnik et al. |
| 8,703,037 B2 | 4/2014 | Hull et al. |
| 8,715,832 B2 | 5/2014 | Ederer et al. |
| 8,718,522 B2 | 5/2014 | Chillscyzn et al. |
| 8,737,862 B2 | 5/2014 | Manico et al. |
| 8,741,194 B1 | 6/2014 | Ederer et al. |
| 8,741,203 B2 | 6/2014 | Liska et al. |
| 8,744,184 B2 | 6/2014 | Ameline et al. |
| 8,761,918 B2 | 6/2014 | Silverbrook |
| 8,801,418 B2 | 8/2014 | El-Siblani et al. |
| 8,805,064 B2 | 8/2014 | Ameline et al. |
| 8,815,143 B2 | 8/2014 | John et al. |
| 8,844,133 B2 | 8/2014 | Fuller |
| 8,845,316 B2 | 9/2014 | Schillen et al. |
| 8,845,953 B1 | 9/2014 | Balistreri et al. |
| 8,862,260 B2 | 10/2014 | Shkolnik et al. |
| 8,872,024 B2 | 10/2014 | Jamar et al. |
| 8,873,024 B2 | 10/2014 | Jamar et al. |
| 8,876,513 B2 | 11/2014 | Lim et al. |
| 8,877,115 B2 | 11/2014 | Elsey |
| 8,888,480 B2 | 11/2014 | Yoo et al. |
| 8,915,728 B2 | 12/2014 | Mironets et al. |
| 8,926,304 B1 | 1/2015 | Chen |
| 8,932,511 B2 | 1/2015 | Napendensky |
| 8,968,625 B2 | 3/2015 | Tan |
| 8,974,717 B2 | 3/2015 | Maguire et al. |
| 8,991,211 B1 | 3/2015 | Arlotti et al. |
| 8,992,816 B2 | 3/2015 | Jonasson et al. |
| 8,998,601 B2 | 4/2015 | Busato |
| 9,011,982 B2 | 4/2015 | Muller et al. |
| 9,031,680 B2 | 5/2015 | Napadensky |
| 9,063,376 B2 | 6/2015 | Mizumura |
| 9,064,922 B2 | 6/2015 | Nakajima et al. |
| 9,067,359 B2 | 6/2015 | Rohner et al. |
| 9,067,360 B2 | 6/2015 | Wehning et al. |
| 9,067,361 B2 | 6/2015 | El-Siblani |
| 9,073,260 B2 | 7/2015 | El-Siblani et al. |
| 9,079,357 B2 | 7/2015 | Ebert et al. |
| 9,101,321 B1 | 8/2015 | Kiesser |
| 9,149,986 B2 | 10/2015 | Huang et al. |
| 9,150,032 B2 | 10/2015 | Roof et al. |
| 9,153,052 B2 | 10/2015 | Ameline et al. |
| 9,159,155 B2 | 10/2015 | Andersen |
| 9,186,847 B2 | 11/2015 | Fruth et al. |
| 9,193,112 B2 | 11/2015 | Ohkusa et al. |
| 9,205,601 B2 | 12/2015 | DeSimone et al. |
| 9,211,678 B2 | 12/2015 | DeSimone et al. |
| 9,216,546 B2 | 12/2015 | DeSimone et al. |
| 9,221,100 B2 | 12/2015 | Schwarze et al. |
| 9,233,504 B2 | 1/2016 | Douglas et al. |
| 9,248,600 B2 | 2/2016 | Goodman et al. |
| 9,259,880 B2 | 2/2016 | Chen |
| 9,308,690 B2 | 4/2016 | Boyer et al. |
| 9,327,385 B2 | 5/2016 | Webb et al. |
| 9,346,217 B2 | 5/2016 | Huang et al. |
| 9,346,218 B2 | 5/2016 | Chen et al. |
| 9,360,757 B2 | 6/2016 | DeSimone et al. |
| 9,364,848 B2 | 6/2016 | Silverbrook |
| 9,403,322 B2 | 8/2016 | Das et al. |
| 9,403,324 B2 | 8/2016 | Ederer et al. |
| 9,415,443 B2 | 8/2016 | Ljungblad et al. |
| 9,415,544 B2 | 8/2016 | Kerekes et al. |
| 9,415,547 B2 | 8/2016 | Chen et al. |
| 9,429,104 B2 | 8/2016 | Fuller |
| 9,434,107 B2 | 9/2016 | Zenere |
| 9,446,557 B2 | 9/2016 | Zenere et al. |
| 9,453,142 B2 | 9/2016 | Rolland et al. |
| 9,456,884 B2 | 10/2016 | Uckelmann et al. |
| 9,457,374 B2 | 10/2016 | Hibbs et al. |
| 9,463,488 B2 | 10/2016 | Ederer et al. |
| 9,469,074 B2 | 10/2016 | Ederer et al. |
| 9,486,944 B2 | 11/2016 | El-Siblani et al. |
| 9,486,964 B2 | 11/2016 | Joyce |
| 9,487,443 B2 | 11/2016 | Watanabe |
| 9,498,920 B2 | 11/2016 | DeSimone et al. |
| 9,498,921 B2 | 11/2016 | Teulet |

(56) References Cited

U.S. PATENT DOCUMENTS

| | | | |
|---|---|---|---|
| 9,511,546 B2 | 12/2016 | Chen et al. | |
| 9,517,591 B2 | 12/2016 | Yoo et al. | |
| 9,517,592 B2 | 12/2016 | Yoo et al. | |
| 9,527,244 B2 | 12/2016 | El-Siblani | |
| 9,527,272 B2 | 12/2016 | Steele | |
| 9,529,371 B2 | 12/2016 | Nakamura | |
| 9,533,450 B2 | 1/2017 | El-Siblani et al. | |
| 9,539,762 B2 | 1/2017 | Durand et al. | |
| 9,545,753 B2 | 1/2017 | Costabeber | |
| 9,545,784 B2 | 1/2017 | Nakamura | |
| 9,550,326 B2 | 1/2017 | Costabeber | |
| 9,561,622 B2 | 2/2017 | Das et al. | |
| 9,561,623 B2 | 2/2017 | El-Siblani et al. | |
| 9,578,695 B2 | 2/2017 | Jerby et al. | |
| 9,579,852 B2 | 2/2017 | Okamoto | |
| 9,581,530 B2 | 2/2017 | Guthrie et al. | |
| 9,592,635 B2 | 3/2017 | Ebert et al. | |
| 9,604,411 B2 | 3/2017 | Rogren | |
| 9,610,616 B2 | 4/2017 | Chen et al. | |
| 9,616,620 B2 | 4/2017 | Hoechsmann et al. | |
| 9,632,037 B2 | 4/2017 | Chen et al. | |
| 9,632,420 B2 | 4/2017 | Allanic | |
| 9,632,983 B2 | 4/2017 | Ueda et al. | |
| 9,636,873 B2 | 5/2017 | Joyce | |
| 9,649,812 B2 | 5/2017 | Hartmann et al. | |
| 9,649,815 B2 | 5/2017 | Atwood et al. | |
| 9,656,344 B2 | 5/2017 | Kironn et al. | |
| 9,670,371 B2 | 6/2017 | Pervan et al. | |
| 9,676,143 B2 | 6/2017 | Kashani-Shirazi | |
| 9,676,963 B2 | 6/2017 | Rolland et al. | |
| 9,682,166 B2 | 6/2017 | Watanabe | |
| 9,682,425 B2 | 6/2017 | Xu et al. | |
| 9,688,027 B2 | 6/2017 | Batchelder et al. | |
| 9,707,720 B2 | 7/2017 | Chen et al. | |
| 9,720,363 B2 | 8/2017 | Chillscyzn et al. | |
| 9,738,034 B2 | 8/2017 | Gruber et al. | |
| 9,738,564 B2 | 8/2017 | Capobianco et al. | |
| 9,751,292 B2 | 9/2017 | Jamar et al. | |
| 9,764,513 B2 | 9/2017 | Stampfl et al. | |
| 9,764,535 B2 | 9/2017 | Xie et al. | |
| 9,821,546 B2 | 11/2017 | Schaafsma et al. | |
| 9,862,146 B2 | 1/2018 | Driessen et al. | |
| 9,862,150 B2 | 1/2018 | Chen et al. | |
| 9,868,255 B2 | 1/2018 | Comb et al. | |
| 9,885,987 B2 | 2/2018 | Chillscysn et al. | |
| 9,895,843 B2 | 2/2018 | Lobovsky et al. | |
| 9,901,983 B2 | 2/2018 | Hovel et al. | |
| 9,908,293 B2 | 3/2018 | Yoo et al. | |
| 9,919,474 B2 | 3/2018 | Napadensky | |
| 9,919,515 B2 | 3/2018 | Daniell et al. | |
| 9,950,368 B2 | 4/2018 | Lampenscherf et al. | |
| 9,956,727 B2 | 5/2018 | Steele | |
| 9,962,767 B2 | 5/2018 | Buller et al. | |
| 9,981,411 B2 | 5/2018 | Green et al. | |
| 10,000,023 B2 | 6/2018 | El-Siblani et al. | |
| 10,011,076 B2 | 7/2018 | El-Siblani et al. | |
| 10,061,302 B2 | 8/2018 | Jacobs et al. | |
| 10,071,422 B2 | 9/2018 | Buller et al. | |
| 10,124,532 B2 | 11/2018 | El-Siblani et al. | |
| 10,150,254 B2 | 12/2018 | Bauman et al. | |
| 10,155,345 B2 | 12/2018 | Ermoshkin et al. | |
| 10,155,882 B2 | 12/2018 | Rolland et al. | |
| 10,183,330 B2 | 1/2019 | Buller et al. | |
| 10,183,444 B2 | 1/2019 | Campbell | |
| 10,240,066 B2 | 3/2019 | Rolland et al. | |
| 10,245,784 B2 | 4/2019 | Teken et al. | |
| 10,317,882 B2 | 6/2019 | de Pena et al. | |
| 10,336,055 B2 | 7/2019 | Das et al. | |
| 10,336,057 B2 | 7/2019 | Moore et al. | |
| 10,350,823 B2 | 7/2019 | Rolland et al. | |
| 10,357,956 B2 | 7/2019 | Usami et al. | |
| 10,406,748 B2 | 9/2019 | Honda | |
| 10,612,112 B2 | 4/2020 | Yang et al. | |
| 10,639,843 B2 | 5/2020 | Yuan et al. | |
| 10,682,808 B2 | 6/2020 | Fujita et al. | |
| 10,695,988 B2 | 6/2020 | Hanyu et al. | |
| 10,717,212 B2 | 7/2020 | Parkinson et al. | |
| 10,737,479 B2 | 8/2020 | El-Siblani et al. | |
| 2002/0164069 A1 | 11/2002 | Nagano et al. | |
| 2003/0180171 A1 | 9/2003 | Artz et al. | |
| 2003/0209836 A1 | 11/2003 | Sherwood | |
| 2005/0012239 A1 | 1/2005 | Nakashima | |
| 2005/0019016 A1 | 9/2005 | Ishikawa et al. | |
| 2006/0230984 A1 | 10/2006 | Bredt et al. | |
| 2006/0248062 A1 | 11/2006 | Libes et al. | |
| 2007/0063366 A1 | 3/2007 | Cunningham et al. | |
| 2007/0116937 A1 | 5/2007 | Lazzerini | |
| 2008/0170112 A1* | 7/2008 | Hull | B29C 64/124 347/127 |
| 2008/0224352 A1 | 9/2008 | Narukawa et al. | |
| 2008/0241404 A1* | 10/2008 | Allaman | B29C 64/357 118/308 |
| 2010/0003619 A1 | 1/2010 | Das et al. | |
| 2010/0196694 A1 | 8/2010 | Yamazaki et al. | |
| 2010/0290016 A1 | 11/2010 | Kaehr et al. | |
| 2011/0089610 A1 | 4/2011 | El-Siblani et al. | |
| 2011/0101570 A1 | 5/2011 | John et al. | |
| 2011/0162989 A1 | 7/2011 | Ducker et al. | |
| 2011/0207057 A1 | 8/2011 | Hull et al. | |
| 2012/0195994 A1 | 8/2012 | El-Siblani et al. | |
| 2012/0292800 A1 | 11/2012 | Higuchi et al. | |
| 2013/0008879 A1 | 1/2013 | Bichsel | |
| 2013/0140741 A1 | 6/2013 | El-Siblani et al. | |
| 2014/0099476 A1 | 4/2014 | Subramanian et al. | |
| 2014/0103581 A1 | 4/2014 | Das et al. | |
| 2014/0200865 A1 | 7/2014 | Lehmann et al. | |
| 2014/0239554 A1 | 8/2014 | El-Siblani et al. | |
| 2014/0275317 A1 | 9/2014 | Moussa | |
| 2014/0319735 A1 | 10/2014 | El-Siblani et al. | |
| 2014/0322374 A1 | 10/2014 | El-Siblani et al. | |
| 2014/0332507 A1 | 11/2014 | Fockele | |
| 2014/0339741 A1 | 11/2014 | Aghababaie et al. | |
| 2014/0348691 A1 | 11/2014 | Ljungblad et al. | |
| 2014/0348692 A1 | 11/2014 | Bessac et al. | |
| 2015/0004042 A1 | 1/2015 | Nimal | |
| 2015/0004046 A1 | 1/2015 | Graham et al. | |
| 2015/0056365 A1 | 2/2015 | Miyoshi | |
| 2015/0086409 A1 | 3/2015 | Hellestam | |
| 2015/0102531 A1 | 4/2015 | El-Siblani et al. | |
| 2015/0104563 A1 | 4/2015 | Lowe et al. | |
| 2015/0140152 A1 | 5/2015 | Chen | |
| 2015/0140155 A1 | 5/2015 | Ohno et al. | |
| 2015/0145174 A1 | 5/2015 | Comb | |
| 2015/0158111 A1 | 6/2015 | Schwarze et al. | |
| 2015/0165695 A1 | 6/2015 | Chen et al. | |
| 2015/0210013 A1 | 7/2015 | Teulet | |
| 2015/0224710 A1 | 8/2015 | El-Siblani | |
| 2015/0231828 A1 | 8/2015 | El-Siblani et al. | |
| 2015/0231831 A1 | 8/2015 | El-Siblani | |
| 2015/0246487 A1 | 9/2015 | El-Siblani | |
| 2015/0251351 A1 | 9/2015 | Feygin | |
| 2015/0268099 A1 | 9/2015 | Craig et al. | |
| 2015/0298396 A1 | 10/2015 | Chen et al. | |
| 2015/0301517 A1 | 10/2015 | Chen et al. | |
| 2015/0306819 A1 | 10/2015 | Ljungblad | |
| 2015/0306825 A1 | 10/2015 | Chen et al. | |
| 2015/0321421 A1 | 11/2015 | Ding | |
| 2015/0352668 A1 | 12/2015 | Scott et al. | |
| 2015/0352791 A1 | 12/2015 | Chen et al. | |
| 2015/0355553 A1 | 12/2015 | Allanic | |
| 2015/0375452 A1 | 12/2015 | Huang et al. | |
| 2016/0016361 A1 | 1/2016 | Lobovsky et al. | |
| 2016/0031010 A1 | 2/2016 | O'Neill et al. | |
| 2016/0046075 A1 | 2/2016 | DeSimone et al. | |
| 2016/0046080 A1 | 2/2016 | Thomas et al. | |
| 2016/0052205 A1 | 2/2016 | FrantzDale | |
| 2016/0059484 A1 | 3/2016 | DeSimone et al. | |
| 2016/0059485 A1 | 3/2016 | Ding et al. | |
| 2016/0067921 A1 | 3/2016 | Willis et al. | |
| 2016/0067929 A1* | 3/2016 | Park | B22F 10/73 425/162 |
| 2016/0082662 A1 | 3/2016 | Majer | |
| 2016/0082671 A1 | 3/2016 | Joyce | |
| 2016/0096332 A1 | 4/2016 | Chen et al. | |

(56) References Cited

U.S. PATENT DOCUMENTS

| | | |
|---|---|---|
| 2016/0107340 A1 | 4/2016 | Joyce |
| 2016/0107383 A1 | 4/2016 | Dikovsky et al. |
| 2016/0107387 A1 | 4/2016 | Ooba et al. |
| 2016/0129631 A1 | 5/2016 | Chen et al. |
| 2016/0137839 A1 | 5/2016 | Rolland et al. |
| 2016/0167160 A1 | 6/2016 | Hellestam |
| 2016/0176114 A1 | 6/2016 | Tsai et al. |
| 2016/0184931 A1 | 6/2016 | Green |
| 2016/0193785 A1 | 7/2016 | Bell et al. |
| 2016/0214327 A1 | 7/2016 | Ucklemann et al. |
| 2016/0221262 A1 | 8/2016 | Das et al. |
| 2016/0243649 A1 | 8/2016 | Zheng et al. |
| 2016/0303798 A1 | 10/2016 | Mironets et al. |
| 2016/0332386 A1 | 11/2016 | Kuijpers |
| 2016/0361871 A1 | 12/2016 | Jeng et al. |
| 2016/0361872 A1 | 12/2016 | El-Siblani |
| 2017/0008234 A1 | 1/2017 | Cullen et al. |
| 2017/0008236 A1 | 1/2017 | Easter et al. |
| 2017/0021562 A1 | 1/2017 | El-Siblani et al. |
| 2017/0066185 A1 | 3/2017 | Ermoshkin et al. |
| 2017/0066196 A1 | 3/2017 | Beard et al. |
| 2017/0072635 A1 | 3/2017 | El-Siblani et al. |
| 2017/0080641 A1 | 3/2017 | El-Siblani |
| 2017/0087670 A1 | 3/2017 | Kalentics et al. |
| 2017/0100895 A1 | 4/2017 | Chou et al. |
| 2017/0100897 A1 | 4/2017 | Chou et al. |
| 2017/0100899 A1 | 4/2017 | El-Siblani et al. |
| 2017/0102679 A1 | 4/2017 | Greene et al. |
| 2017/0113409 A1 | 4/2017 | Patrov |
| 2017/0120332 A1 | 5/2017 | DeMuth et al. |
| 2017/0120333 A1 | 5/2017 | DeMuth et al. |
| 2017/0120334 A1 | 5/2017 | DeMuth et al. |
| 2017/0120335 A1 | 5/2017 | DeMuth et al. |
| 2017/0120336 A1 | 5/2017 | DeMuth et al. |
| 2017/0120387 A1 | 5/2017 | DeMuth et al. |
| 2017/0120518 A1 | 5/2017 | DeMuth et al. |
| 2017/0120529 A1 | 5/2017 | DeMuth et al. |
| 2017/0120530 A1 | 5/2017 | DeMuth et al. |
| 2017/0120537 A1 | 5/2017 | DeMuth et al. |
| 2017/0120538 A1 | 5/2017 | DeMuth et al. |
| 2017/0123222 A1 | 5/2017 | DeMuth et al. |
| 2017/0123237 A1 | 5/2017 | DeMuth et al. |
| 2017/0136688 A1 | 5/2017 | Knecht et al. |
| 2017/0136708 A1 | 5/2017 | Das et al. |
| 2017/0157841 A1 | 6/2017 | Green |
| 2017/0157862 A1 | 6/2017 | Bauer |
| 2017/0165916 A1 | 6/2017 | El-Siblani |
| 2017/0173865 A1 | 6/2017 | Dikovsky et al. |
| 2017/0182708 A1 | 6/2017 | Lin et al. |
| 2017/0190120 A1 | 7/2017 | Bloome et al. |
| 2017/0276651 A1 | 9/2017 | Hall |
| 2017/0284971 A1 | 10/2017 | Hall |
| 2017/0291804 A1 | 10/2017 | Craft et al. |
| 2017/0297108 A1 | 10/2017 | Gibson et al. |
| 2017/0297109 A1 | 10/2017 | Gibson et al. |
| 2017/0305136 A1 | 10/2017 | Elsey |
| 2017/0326786 A1 | 11/2017 | Yuan et al. |
| 2017/0326807 A1 | 11/2017 | Greene et al. |
| 2017/0368816 A1 | 12/2017 | Batchelder et al. |
| 2018/0001567 A1 | 1/2018 | Juan et al. |
| 2018/0015672 A1 | 1/2018 | Shusteff et al. |
| 2018/0043619 A1 | 2/2018 | Kim et al. |
| 2018/0056585 A1 | 3/2018 | Du Toit |
| 2018/0056604 A1 | 3/2018 | Sands et al. |
| 2018/0079137 A1 | 3/2018 | Herzog et al. |
| 2018/0085998 A1 | 3/2018 | von Burg |
| 2018/0117790 A1 | 5/2018 | Yun |
| 2018/0169969 A1 | 6/2018 | Deleon et al. |
| 2018/0200948 A1 | 7/2018 | Kuijpers et al. |
| 2018/0201021 A1 | 7/2018 | Beaver et al. |
| 2018/0229332 A1 | 8/2018 | Tsai et al. |
| 2018/0229436 A1 | 8/2018 | Gu et al. |
| 2018/0272603 A1 | 9/2018 | MacCormack et al. |
| 2018/0272608 A1 | 9/2018 | Yun |
| 2018/0333913 A1* | 11/2018 | Lin ............... B29C 64/264 |
| 2018/0345600 A1 | 12/2018 | Holford et al. |
| 2018/0370214 A1 | 12/2018 | Comb et al. |
| 2019/0022937 A1 | 1/2019 | Stelter et al. |
| 2019/0039299 A1 | 2/2019 | Busbee et al. |
| 2019/0047211 A1 | 2/2019 | Herring et al. |
| 2019/0061230 A1 | 2/2019 | Ermoshkin et al. |
| 2019/0112499 A1 | 4/2019 | Rolland et al. |
| 2019/0126548 A1 | 5/2019 | Barnhart et al. |
| 2019/0232550 A1 | 8/2019 | Mark et al. |
| 2019/0240932 A1 | 8/2019 | Graf |
| 2019/0263054 A1 | 8/2019 | Kotler et al. |
| 2019/0283316 A1 | 9/2019 | Rolland et al. |
| 2019/0344381 A1 | 11/2019 | Pomerantz et al. |
| 2019/0389137 A1 | 12/2019 | Frohnmaier et al. |
| 2020/0001398 A1 | 1/2020 | Mellor et al. |
| 2020/0079008 A1 | 3/2020 | Chowdry et al. |
| 2020/0079017 A1 | 3/2020 | MacNeish, III et al. |
| 2020/0108553 A1 | 4/2020 | Rogren |
| 2020/0164437 A1 | 5/2020 | Goth et al. |
| 2020/0198224 A1 | 6/2020 | Dubelman et al. |
| 2020/0230938 A1 | 7/2020 | Menchik et al. |
| 2020/0247040 A1 | 8/2020 | Green |
| 2020/0262150 A1 | 8/2020 | Dubelman et al. |
| 2020/0290275 A1 | 9/2020 | Dubelman et al. |
| 2020/0307075 A1 | 10/2020 | Mattes et al. |
| 2020/0376775 A1 | 12/2020 | Das et al. |
| 2021/0046695 A1 | 2/2021 | Thompson et al. |

FOREIGN PATENT DOCUMENTS

| | | |
|---|---|---|
| CN | 103522546 A | 1/2014 |
| CN | 104175559 A | 12/2014 |
| CN | 104647752 A | 5/2015 |
| CN | 105711101 A | 6/2016 |
| CN | 105773962 A | 7/2016 |
| CN | 107322930 A | 11/2017 |
| CN | 208946717 U | 6/2019 |
| CN | 109968661 A | 7/2019 |
| CN | 111497231 A | 8/2020 |
| DE | 102007010624 A1 | 9/2008 |
| EP | 448459 A1 | 9/1991 |
| EP | 557051 A1 | 8/1993 |
| EP | 1454831 B1 | 9/2004 |
| EP | 1852244 A2 | 11/2007 |
| EP | 1864785 A1 | 12/2007 |
| EP | 1946908 A2 | 7/2008 |
| EP | 2521524 A1 | 11/2012 |
| EP | 3053729 A1 | 8/2016 |
| EP | 3453521 A1 | 3/2019 |
| EP | 3356121 B1 | 10/2020 |
| GB | 2311960 A | 10/1997 |
| JP | H06246839 A | 9/1994 |
| JP | 2002370286 A | 12/2002 |
| JP | 2003039564 A | 2/2003 |
| JP | 2004/257929 A | 9/2004 |
| JP | 2016196098 A | 11/2016 |
| KR | 20170108729 A | 9/2017 |
| KR | 102109664 B1 | 5/2020 |
| WO | WO9600422 A1 | 1/1996 |
| WO | WO9806560 | 2/1998 |
| WO | WO0100390 A1 | 1/2001 |
| WO | WO2006/077665 A1 | 7/2006 |
| WO | WO2006/109355 A1 | 10/2006 |
| WO | WO2017009368 A1 | 1/2017 |
| WO | WO2017098968 A1 | 6/2017 |
| WO | WO2017100538 A1 | 6/2017 |
| WO | WO2019/159936 A1 | 8/2019 |
| WO | WO2020033607 A1 | 2/2020 |
| WO | WO2020185553 A1 | 9/2020 |

OTHER PUBLICATIONS

Carbon, Carbon SpeedCell: Additive Manufacturing Reinvented, Redwood City California, Mar. 16, 2017, 4 Pages. Retrieved from Webpage: https://www.carbon3d.com/news/carbon-speedcell-additive-manufacturing-reinvented/.

Carbon, The 3D Printer for Products that Outperform, 8 Pages. Retrieved from Webpage: https://www.carbon3d.com.

(56) References Cited

OTHER PUBLICATIONS

DDM Systems, Disruptive Technologies for Additive Manufacturing, 2014. Retrieved on Jul. 7, 2020 from Web Link: http://www.ddmsys.com/.

Designing Buildings Wiki, Types of Brick Bonding, 6 Pages. Retrieved Mar. 25, 2021 from Webpage: https://www.designingbuildings.co.uk//wiki/Types_of_brick_bonding.

Doctor Blade with Micrometer Screw Gauge, The Tape Casting Warehouse, Inc., Morrisville PA, 6 Pages. Retrieved Mar. 23, 2021 from Webpage: https://www.drblade.com/.

Envisiontec, Advanced DLP for Superior 3D Printing, Mar. 9, 2017, 8 Pages. https://envisiontec.com/wp-content/uploads/2016/12/Why-EnvisionTEC-DLP-3D-Printing-is-Better-rebranded.pdf.

Feng et al., Exposure Reciprocity Law in Photopolymerization of Multi-Functional Acrylates and Methacrylates, Macromolecular Chemistry and Physics, vol. 208, 2007, pp. 295-306.

Formlabs, An Introduction to Post-Curing SLA 3D Prints, 8 Pages. Retrieved from Webpage: https://formlabs.com/blog/introduction-post-curing-sla-3d-prints.

Formlabs, Form Wash & Form Cure, 8 Pages. Retrieved from Webpage: https://formlabs.com/tools/wash-cure/.

Hafkamp et al., A Feasibility Study on Process Monitoring and Control in Vat Photopolymerization of Ceramics, Mechatronics, vol. 56, The Netherlands, Dec. 2018, pp. 220-241. Retrieved from https:/doi.org/10.1016/j.mechatronics.2018.02.006.

KUDO3D, Post-Process Your SLA Prints in 4 Easy Steps, 8 Pages. Retrieved from Webpage: https://www.kudo3d.com/post-process-your-sla-prints-in-4-easy-steps/.

Leap, Low-Frequency Sonic Mixing Technology, Energy Efficiency & Renewable Energy, Energy.Gov, 5 Pages. Retrieved Mar. 17, 2021 from Webpage: https://www.energy.gov/eere/amo/low-frequency-sonic-mixing-technology.

Lee et al., Development of a 3D Printer Using Scanning Projection Stereolithography, Scientific Reports, vol. 5, Article No. 9875, 2015, 5 pages. https://www.nature.com/articles/srep09875#s1.

Lee et al., Large-Area Compatible Laser Sintering Schemes with a Spatially Extended Focused Beam, Journal, Micromachines, vol. 8, No. 153, Seoul University, Seoul Korea, May 11, 2017, 8 Pages. http://dx.doi.org/10.3390/mi8050153.

Limaye, Multi-Objective Process Planning Method for Mask Projection Stereolithography, Dissertation Georgia Institute of Technology, Dec. 2007, 324 Pages.

Lithoz, 2 Pages. Retrieved from Webpage: http://www.lithoz.com/en/out-products/cleaning-station.

Matthews et al., Diode-Based Additive Manufacturing of Metals Using an Optically-Addressable Light Valve, Optic Express Research Article, vol. 25, No. 10, Lawrence Livermore National Laboratory, Livermore CA, May 10, 2017.

MICRON3D, Cleaning of Printed Models, YouTube, Dec. 5, 2016, 1 Page. Retrieved from Webpage: https://www.youtube.com/watch?v=so_AIrSs1iBY.

Nussbaum et al., Evaluation of Processing Variables in Large Area Polymer Sintering of Single Layer Components, Solid Freeform Fabrication 2016: Proceedings of the 27$^{th}$ Annual International Solid Freeform Fabracation Symposium—An Additive Manufacturing Conference Reviewed Paper, University of South Florida, Tampa Florida.

Omegasonics, Ultrasonic Cleaning of 3D Printer Parts, YouTube, Feb. 26, 2014, 1 Page. Retrieved from Webpage: https://www.youtube.com/watch?v=Gxj47OS5ohk.

Park et al., Development of Multi-Material DLP 3D Printer, Journal of the Korean Society of Manufacturing Technology Engineers, vol. 26, Issue 1, Seoul Korea, Feb. 15, 2017, pp. 100-107. https://doi.org/10.7735/ksmte.2017.26.1.100.

Prodways Tech, Prodways Movinglight Technology Retrieved on Jul. 2, 2020 from Web Link: https://www.prodways.com/en/the-prodways-movinglight-technology/.

RAMCO Equipment Corporation, RAMCO RamTough-Fully Automated Wash/Rinse/Dry System, YouTube, Jul. 9, 2013, 1 Page. Retrieved from Webpage: https://www.youtube.com/watch?v=18SSOc3FVFU.

Ricoh Imaging Company Ltd., The Advanced Pixel Shift Resolution System II for Super-High-Resolution Images, Pentax K-1 Mark II, Pixel Shift Resolution System, 4 Pages. Retrieved on Mar. 30, 2021 from Webpage: http://www.ricoh-imaging.co.jp/english/product/k-1-2/feature/02.html.

Sonics & Materials, Inc., Ultrasonic Food Cutting Equipment, Sonics & Materials, Inc., Retrieved on Jun. 26, 2020, 4 Pages. https://www.sonics.com/food-cutting.

Stemmer Imaging, Ultra-High Resolution for Industrial Imaging, Germany, 9 Pages. Retrieved on Mar. 30, 2021 from Webpage: https://www.stemmer-imaging.com/en/knowledge-base/pixel-shift-technology/.

Stevenson, Admatec's Ceramic 3D Printers, Ceramic, Metal, Fabbaloo 3D Printing News, Jan. 21, 2019, 8 Pages. Retrieved Nov. 24, 2020 from Weblink: https://www.fabbaloo.com/blog/2019/1/21/admatecs-ceramic-3d-printers.

Techmetals, Electroless Nickel (TM 117C), Engineered Metal Finishing & Performance Coatings, 1 Page. Retrieved from Webpage: https://techmetals.com/pdfs/TM_117C.pdf https://techmetals.com/tm117c-2/.

Telsonic Ultrasonics, Cutting Awning Fabrics and Sealing the Edge, The Powerhouse of Ultrasonics, 2017, 1 Page. https://www.telsonic.com/fileadmin/applications/AS_206_Cut_Seal_Markisengewebe_EN.pdf.

Telsonic Ultrasonics, Integrated Power Actuator—IPA 3505, Telsonic Ultrasonics, Retrieved Jun. 26, 2020, 2 Pages. https://www.telsonic.com/en/products/integrated-power-actuator-ipa-3505/.

Tok et al., Tape Casting of High Dielectric Ceramic Substrates for Microelectronics Packaging, Journal of Materials Engineering and Performance, vol. 8, 1999, pp. 469-472. (Abstract Only) https://link.springer.com/article/10.1361/105994999770346783.

Wikipedia, Pixel Shifting, 2 p. Retrieved Mar. 30, 2021 from Webpage: https://en.wikipedia.org/wiki/Pixel_shifting.

Wikipedia, Standing Wave, 11 Pages. Retrieved Mar. 17, 2021 from Webpage: https://en.wikipedia.org/wiki/Standing_wave.

* cited by examiner

MATERIAL DEPOSITION ASSEMBLY FOR ADDITIVE MANUFACTURING

CROSS-REFERENCE TO RELATED APPLICATION

The present application claims priority to U.S. Provisional Patent Application Ser. No. 63/232,673, filed on Aug. 13, 2021, the contents of which of which are hereby incorporated by reference in their entirety.

FIELD

The present subject matter relates generally to an additive manufacturing apparatus, and more particularly to a deposition assembly for the additive manufacturing apparatus.

BACKGROUND

Additive manufacturing is a process in which material is built up layer-by-layer to form a component. Stereolithography (SLA) is a type of additive manufacturing process, which employs a vessel of radiant-energy curable photopolymer "resin" and a curing energy source, such as a laser. Similarly, Digital Light Processing (DLP) three-dimensional (3D) printing employs a two-dimensional image projector to build components one layer at a time. For each layer, the energy source draws or flashes a radiation image of the cross section of the component onto the surface of the resin. Exposure to the radiation cures and solidifies the pattern in the resin and joins it to a previously cured layer.

In some instances, additive manufacturing may be accomplished through a "tape casting" process. In this process, a resin is deposited onto a resin support, which may be a flexible radiotransparent tape, a foil, and/or another type of resin support, that is fed out from a supply reel to a build zone. Radiant energy is used to cure the resin to a component that is supported by a stage in the build zone. Once the curing of the first layer is complete, the stage and the resin support are separated from one another. The resin support is then advanced, and fresh resin is provided to the build zone. In turn, the first layer of the cured resin is placed onto the fresh resin and cured through the energy device to form an additional layer of the component. Subsequent layers are added to each previous layer until the component is completed.

In operation, a layer of resin may be deposited on the resin support through a deposition assembly for forming a layer of the component. However, in some instances, agglomerates, partially cured resin pieces, and/or other foreign objects may be retained within the deposition assembly causing variations within the layer of resin deposited on the resin support. Accordingly, it may be beneficial for the additive manufacturing apparatus to include a deposition assembly that may be capable of flushing agglomerates, partially cured resin pieces, and/or other foreign objects from the deposition assembly.

BRIEF DESCRIPTION OF THE DRAWINGS

A full and enabling disclosure of the present subject matter, including the best mode thereof, directed to one of ordinary skill in the art, is set forth in the specification, which refers to the appended figures.

Figure 1:
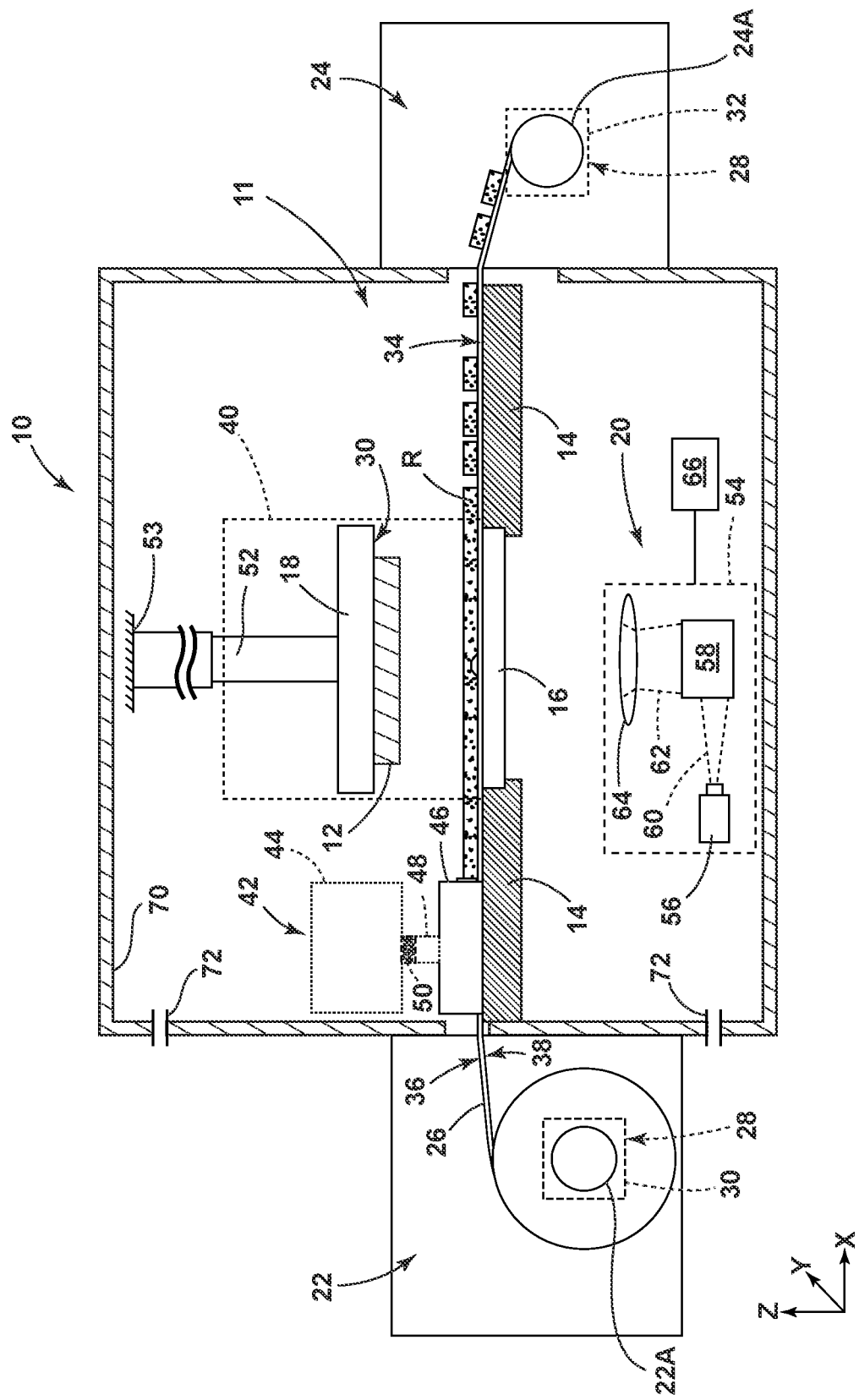
FIG. 1 is a schematic side view of an additive manufacturing apparatus in accordance with various aspects of the present disclosure.

Repeat use of reference characters in the present specification and drawings is intended to represent the same or analogous features or elements of the present disclosure.

DETAILED DESCRIPTION

Reference will now be made in detail to present embodiments of the present disclosure, one or more examples of which are illustrated in the accompanying drawings. The detailed description uses numerical and letter designations to refer to features in the drawings. Like or similar designations in the drawings and description have been used to refer to like or similar parts of the present disclosure.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to a resin support movement along the manufacturing apparatus. For example, "upstream" refers to the direction from which the resin support moves, and "downstream" refers to the direction to which the resin support moves. The term "selectively" refers to a component's ability to operate in various states (e.g., an ON state and an OFF state) based on manual and/or automatic control of the component.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Here and throughout the specification and claims, range limitations are combined, and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

The present disclosure is generally directed to an additive manufacturing apparatus that implements various manufacturing processes such that successive layers of material(s) (e.g., resins) are provided on each other to "build up," layer-by-layer, a three-dimensional component. The successive layers generally cure together to form a monolithic component which may have a variety of integral sub-components. Although additive manufacturing technology is described herein as enabling the fabrication of complex objects by building objects point-by-point, layer-by-layer, variations of the described additive manufacturing apparatus and technology are possible and within the scope of the present subject matter.

The additive manufacturing apparatus can include a support plate, a window supported by the support plate, and a stage moveable relative to the window. The additive manufacturing apparatus further includes a resin support (such as a flexible tape or foil) that supports a resin. The resin support, with the resin thereon, is positioned between the stage and the window. A radiant energy device is configured to cure a portion of the resin forming the component, which is translated towards and away from the resin support by the stage between successive curing operations.

In various embodiments, the apparatus further includes a deposition assembly upstream of the stage. The deposition assembly can be configured to deposit a resin on a resin support. The deposition assembly includes a reservoir housing configured to retain a volume of resin between the upstream wall and the downstream wall and an actuatable application device operably coupled with the reservoir housing. In some instances, the application device is configured as a doctor blade that defines a thickness of the resin as the resin is translated on the resin support.

A computing system can be operably coupled with the application device. The computing system can be configured to intermittently initiate a flush operation between successive layers of the component. During a flush operation of the resin, the application device is moved from a first position to a second position.

In some embodiments, the deposition assembly can include a first application device independently movable from the second application device with the first application device being upstream of the second application device. In various embodiments, the first application device and/or the second application device may be actuated independently of one another. At various times during operation, the deposition assembly may be capable of defining various thicknesses along different portions of the layer of resin on the resin support, which may be beneficial for flushing agglomerates, partially cured resin pieces, and/or other foreign objects from the deposition assembly.

Additionally, in some embodiments, a wiper assembly may translate a scraper along a bottom portion of the application device to remove at least a portion of resin, agglomerates, partially cured resin pieces, and/or other foreign objects that may be coupled and movable with the application device. It will be appreciated, however, that the scraper may be translated along the application device when the application device is in any position.

Referring to the drawings wherein identical reference numerals denote the similar elements throughout the various views, FIG. 1 schematically illustrates an example of one type of suitable apparatus 10 for forming a component 12 created through one or more cured layers of the resin R. The apparatus 10 can include one or more of a support plate 14, a window 16, a stage 18 that is movable relative to the window 16, and a radiant energy device 20, which, in combination, may be used to form any number (e.g., one or more) of additively manufactured components 12.

In the illustrated example, the apparatus 10 includes a feed module 22, which may include a feed mandrel 22A, and a take-up module 24, which may include a take-up mandrel 24A, that are spaced-apart and configured to couple with respective end portions of a resin support 26, such as a flexible tape or foil or another type of the resin support extending therebetween. Suitable mechanical supports (frames, brackets, etc.) may be provided for the mandrels 22A, 24A and the support plate 14. The feed mandrel 22A and/or the take-up mandrel 24A can be configured to control the speed and direction of the resin support 26 such that the desired tension and speed is maintained in the resin support 26 through a drive system 28. In various examples, the drive system 28 can be configured as one or more control devices 30, 32 respectively associated with the feed mandrel 22A and/or the take-up mandrel 24A. Moreover, the drive system 28 may include various components, such as motors, actuators, feedback sensors, and/or controls can be provided for driving the mandrels 22A, 24A in such a manner to move at least a portion of a resin support 26 between the mandrels 22A, 24A.

In various embodiments, the window 16 is transparent and can be operably supported by the support plate 14. In some instances, the window 16 and the support plate 14 can be integrally formed such that one or more windows 16 are integrated within the support plate 14. Likewise, the resin support 26 is also transparent or includes portions that are transparent. As used herein, the terms "transparent" and "radiotransparent" refer to a material that allows at least a portion of radiant energy of a selected wavelength to pass through. For example, the radiant energy that passes through the window 16 and the resin support 26 can be in the ultraviolet spectrum, the infrared spectrum, the visible spectrum, or any other practicable radiant energy. Non-limiting examples of transparent materials include polymers, glass, and crystalline minerals, such as sapphire or quartz.

The resin support 26 extends between the feed module 22 and the take-up module 24 and defines a "resin surface" 34. In some instances, the resin surface 34 may be defined by a first side 36 of the resin support 26 and may be positioned to face the stage 18 with the window 16 on an opposing, second side 38 of the resin support 26 from the stage 18. For purposes of convenient description, the resin surface 34 may be considered to be oriented parallel to an X-Y plane of the apparatus 10, and a direction perpendicular to the X-Y plane is denoted as a Z-axis direction (X, Y, and Z being three mutually perpendicular directions). As used herein, the X-axis refers to the machine direction along the length of the resin support 26. As used herein, the Y-axis refers to the transverse direction across the width of the resin support 26 and generally perpendicular to the machine direction. As used herein, the Z-axis refers to the stage direction that can be defined as the direction of movement of the stage 18 relative to the window 16.

The resin surface 34 may be configured to be "non-stick," that is, resistant to adhesion of a cured resin R. The non-stick properties may be embodied by a combination of variables such as the chemistry of the resin support 26, its surface finish, and/or applied coatings. For instance, a permanent or semi-permanent non-stick coating may be applied. One non-limiting example of a suitable coating is polytetrafluoroethylene ("PTFE"). In some examples, all or a portion of the resin surface 34 may incorporate a controlled roughness or surface texture (e.g. protrusions, dimples, grooves, ridges, etc.) with nonstick properties. Additionally or alternatively, the resin support 26 may be made in whole or in part from an oxygen-permeable material.

For reference purposes, an area or volume immediately surrounding the location of the resin support 26 and the window 16 or transparent portion defined by the support plate 14 may be defined as a "build zone," labeled 40.

In some instances, the apparatus 10 may further include a deposition assembly 42. The deposition assembly 42 may be any device or combination of devices that is operable to apply a layer of the resin R on the resin support 26. The deposition assembly 42 may optionally include a device or combination of devices to define a height of the resin R on the resin support 26 and/or to level the resin R on the resin support 26. Nonlimiting examples of suitable material deposition assemblies include chutes, hoppers, pumps, spray nozzles, spray bars, or printheads (e.g. inkjets).

In the illustrated embodiment, the deposition assembly 42 includes a vessel 44 and a reservoir 46. A conduit 48 extends from the vessel 44 to direct resin from the vessel 44 to the reservoir 46. The conduit 48 may be positioned along a bottom portion of the vessel 44 such that the resin R may be fed from the vessel 44 to the conduit 48, which may generally prevent the introduction of air to the resin R as the air is transferred into and/or through the conduit 48. In some instances, a filter 50 may be positioned upstream, downstream, and/or within the conduit 48 with respect to the flow of resin from the vessel 44 to the reservoir 46. In several instances, the resin may be gravity fed through the filter 50 prior to entering the reservoir 46 to catch various agglomerates, partially cured resin pieces, and/or other foreign objects that may affect the resin once it is thinned out on the resin support 26 or may affect the quality of the component 12.

The reservoir 46 may include any assembly to control the thickness of the resin R applied to the resin support 26, as the resin support 26 passes under and/or through the reservoir 46. The reservoir 46 may be configured to retain a volume 76 of the resin R and define a thickness of the resin R on the resin support 26 as the resin support 26 is translated in an X-axis direction. The vessel 44 may be positioned above the reservoir 46 in a Z-axis direction, or in any other position, and configured to store additional resin R. In various embodiments, when the volume 76 of the resin R within the reservoir 46 deviates from a predefined range, additional resin R is supplied from the vessel 44 to the reservoir 46.

The resin R includes any radiant-energy curable material, which is capable of adhering or binding together the filler (if used) in the cured state. As used herein, the term "radiant-energy curable" refers to any material which solidifies or partially solidifies in response to the application of radiant energy of a particular frequency and energy level. For example, the resin R may include a photopolymer resin containing photo-initiator compounds functioning to trigger a polymerization reaction, causing the resin R to change from a liquid (or powdered) state to a solid state. Alternatively, the resin R may include a material that contains a solvent that may be evaporated out by the application of radiant energy. The resin R may be provided in solid (e.g. granular) or liquid form, including a paste or slurry.

Furthermore, the resin R can have a relatively high viscosity fluid that will not "slump" or run off during the build process. The composition of the resin R may be selected as desired to suit a particular application. Mixtures of different compositions may be used. The resin R may be selected to have the ability to out-gas or burn off during further processing, such as a sintering process.

The resin R may incorporate a filler. The filler may be pre-mixed with the resin R, then loaded into the deposition assembly 42. The filler includes particles, which are conventionally defined as "a very small bit of matter." The filler may include any material that is chemically and physically compatible with the selected resin R. The particles may be regular or irregular in shape, may be uniform or non-uniform in size, and may have variable aspect ratios. For example, the particles may take the form of powder, of small spheres or granules, or may be shaped like small rods or fibers.

The composition of the filler, including its chemistry and microstructure, may be selected as desired to suit a particular application. For example, the filler may be metallic, ceramic, polymeric, and/or organic. Other examples of potential fillers include diamond, silicon, and graphite. Mixtures of different compositions may be used. In some examples, the filler composition may be selected for its electrical or electromagnetic properties, e.g. it may specifically be an electrical insulator, a dielectric material, an electrical conductor, and/or magnetic.

The filler may be "fusible," meaning it is capable of consolidation into a mass via application of sufficient energy. For example, fusibility is a characteristic of many available powders including, but not limited to, polymeric, ceramic, glass, and/or metallic materials. The proportion of filler to resin R may be selected to suit a particular application. Generally, any amount of filler may be used so long as the combined material is capable of flowing and being leveled, and there is sufficient resin R to hold together the particles of the filler in the cured state.

With further reference to FIG. 1, the stage 18 is capable of being oriented parallel to the resin surface 34 or the X-Y plane. Various devices may be provided for moving the stage 18 relative to the window 16 parallel to the Z-axis direction. For example, as illustrated in FIG. 1, the movement may be provided through an actuator 52 connected between the stage 18 and a static support 53 and configured to change a relative position of the stage 18 relative to the radiant energy device 20, the support plate 14, the window 16, and/or any other static component 12 of the apparatus 10. The actuator 52 may be configured as a ballscrew electric actuator, linear electric actuator, pneumatic cylinder, hydraulic cylinder, delta drive, or any other practicable device may additionally or alternatively be used for this purpose. In addition to, or as an alternative to, making the stage 18 movable, the resin support 26 could be movable parallel to the Z-axis direction.

The radiant energy device 20 may be configured as any device or combination of devices operable to generate and project radiant energy on the resin R in a suitable pattern and with a suitable energy level and other operating characteristics to cure the resin R during the build process. For example, as shown in FIG. 1, the radiant energy device 20 may include a projector 54, which may generally refer to any device operable to generate a radiant energy patterned image of suitable energy level and other operating characteristics to cure the resin R. As used herein, the term "patterned image" refers to a projection of radiant energy comprising an array of one or more individual pixels. Non-limiting examples of patterned imaged devices include a DLP projector or another digital micromirror device, a two-dimensional array of LEDs, a two-dimensional array of lasers, and/or optically addressed light valves. In the illustrated example, the projector 54 includes a radiant energy source 56 such as a UV lamp, an image forming apparatus 58 operable to receive a source beam 60 from the radiant energy source 56 and generate a patterned image 62 to be projected onto the surface of the resin R, and optionally focusing optics 64, such as one or more lenses.

The image forming apparatus 58 may include one or more mirrors, prisms, and/or lenses and is provided with suitable actuators, and arranged so that the source beam 60 from the radiant energy source 56 can be transformed into a pixelated image in an X-Y plane coincident with the surface of the resin R. In the illustrated example, the image forming apparatus 58 may be a digital micro-mirror device.

The projector 54 may incorporate additional components, such as actuators, mirrors, etc. configured to selectively move the image forming apparatus 58 or another part of the projector 54 with the effect of rastering or shifting the location of the patterned image on the resin surface 34. Stated another way, the patterned image may be moved away from a nominal or starting location.

In addition to other types of radiant energy devices 20, the radiant energy device 20 may include a "scanned beam apparatus" used herein to refer generally to any device operable to generate a radiant energy beam of suitable energy level and other operating characteristics to cure the resin R and to scan the beam over the surface of the resin R in a desired pattern. For example, the scanned beam apparatus can include a radiant energy source 56 and a beam steering apparatus. The radiant energy source 56 may include any device operable to generate a beam of suitable power and other operating characteristics to cure the resin R. Non-limiting examples of suitable radiant energy sources 56 include lasers or electron beam guns.

The apparatus 10 may be operably coupled with a computing system 66. The computing system 66 in FIG. 1 is a generalized representation of the hardware and software that may be implemented to control the operation of the apparatus 10, including some or all of the stage 18, the radiant energy device 20, the actuator 52, and the various parts of the apparatus 10 described herein. The computing system 66 may be embodied, for example, by software running on one or more processors embodied in one or more devices such as a programmable logic controller ("PLC") or a microcomputer. Such processors may be coupled to process sensors and operating components, for example, through wired or wireless connections. The same processor or processors may be used to retrieve and analyze sensor data, for statistical analysis, and for feedback control. Numerous aspects of the apparatus 10 may be subject to closed-loop control.

Optionally, the modules of the apparatus 10 may be surrounded by a housing 70, which may be used to provide a shielding or inert gas (e.g., a "process gas") atmosphere using gas ports 72. Optionally, pressure within the housing 70 could be maintained at a desired level greater than or less than atmospheric. Optionally, the housing 70 could be temperature and/or humidity controlled. Optionally, ventilation of the housing 70 could be controlled based on factors such as a time interval, temperature, humidity, and/or chemical species concentration. In some embodiments, the housing 70 can be maintained at a pressure that is different than an atmospheric pressure.

Figure 2:
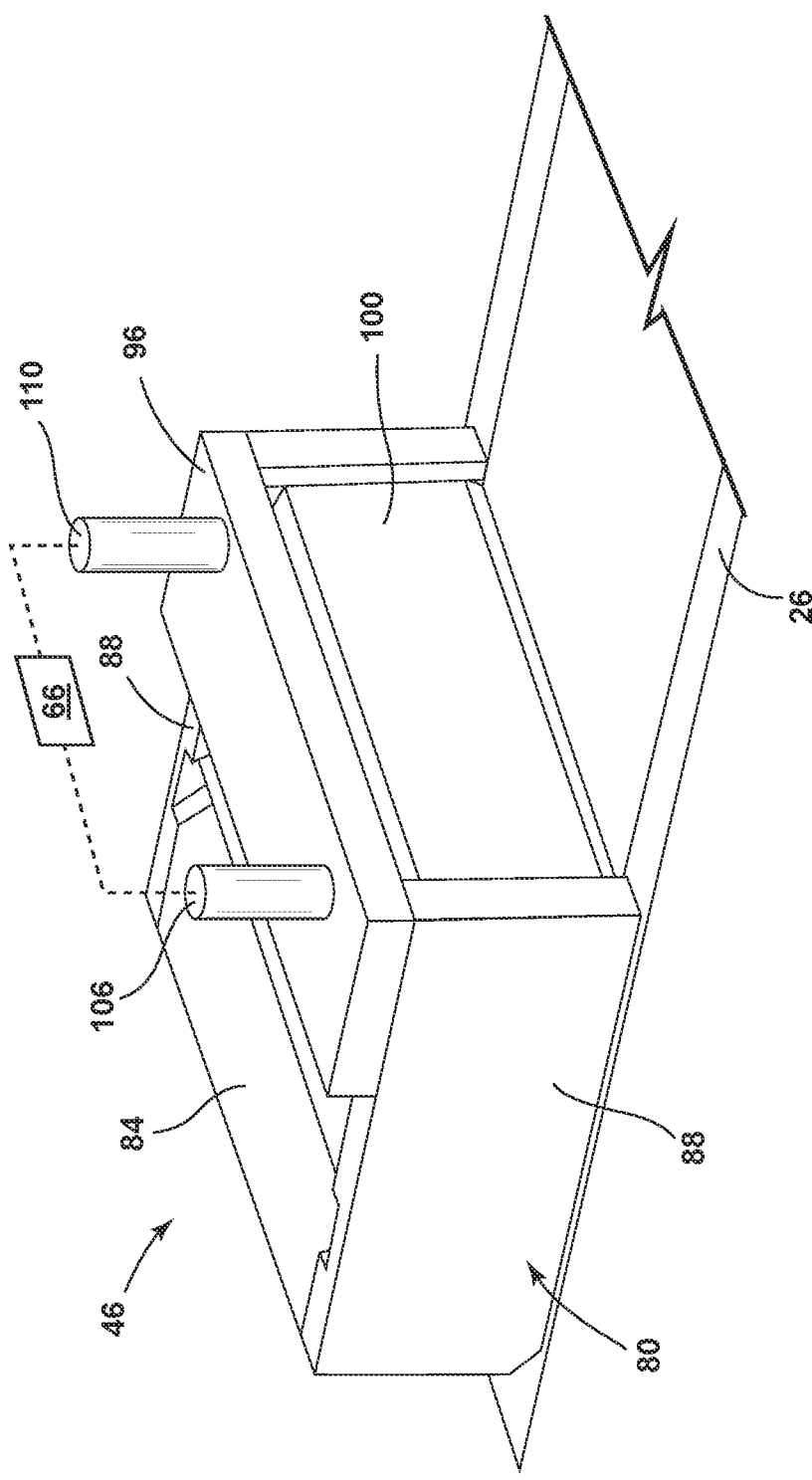
FIG. 2 is a perspective view of a deposition assembly of the apparatus in accordance with various aspects of the present disclosure.
Figure 3:
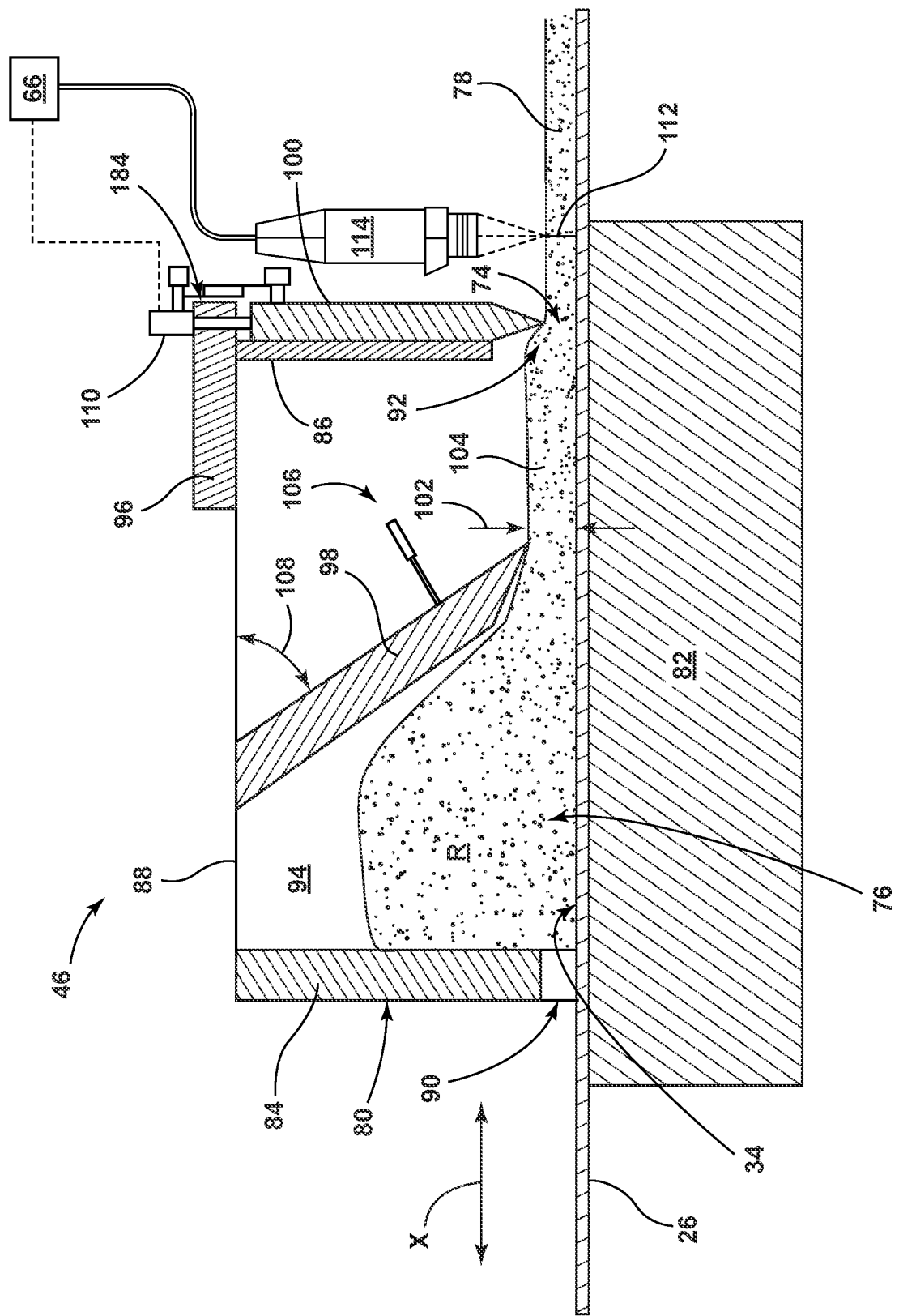
FIG. 3 is a side schematic view of the deposition assembly in accordance with various aspects of the present disclosure.

Referring to FIGS. 2 and 3, a perspective view and a schematic view of the reservoir 46 of the deposition assembly 42 are respectively illustrated according to various embodiments of the present disclosure. The reservoir 46 may be configured to retain a volume 76 of the resin R and produce a layer 78 of the resin R on the resin support 26 as the resin support 26 is translated in an X-axis direction.

In some embodiments, the reservoir 46 includes a reservoir housing 80 that can include a base 82, an upstream wall 84, a downstream wall 86, and sidewalls 88. The upstream wall 84 may define a slot 90 therein to receive the resin support 26. The downstream wall 86 may define an aperture 92 that serves as an outlet for the resin support 26 and the layer 78 of the resin R. In various embodiments, the upstream wall 84, the downstream wall 86, and the sidewalls 88 define a cavity 94 that is configured to retain the volume 76 of the resin R. A mount 96 may be integrally formed with and/or later attached to the reservoir housing 80. The mount 96 may be configured to support one or more modules of the deposition assembly 42.

Continuing to refer to FIGS. 2 and 3, in various examples, the deposition assembly 42 can include an actuatable spreader assembly 98, which may be in the form of a doctor blade, and/or an actuatable application device 100, which may also be in the form of a doctor blade, that are used to control the thickness of the resin R applied to the resin support 26, as the resin support 26 passes under the deposition assembly 42. In the illustrated embodiment, the thickness of the layer 78 of the resin R is determined by the spreader assembly 98 and/or the application device 100. In various embodiments, the spreader assembly 98 and/or the application device 100 may be configured as other material depositing and/or leveling apparatuses that can be used separately or in combination with the illustrated doctor blades. The other material depositing and/or leveling apparatuses can include, but are not limited to, gravure rolls, metering rolls, weir-based cascades, direct die casting, and/or a combination thereof.

The spreader assembly 98 may be configured to act as a gross control for the thickness 102 of an initial deposited layer 104 of the resin R such that it forms an initial thickness. An adjustment device 106 may be configured to adjust an angle 108 defined by a surface of the spreader assembly 98 and the top edge of the sidewall 146. The greater the angle 108, the lower thickness 102, i.e., the thinner initial deposited layer 104 will be. The adjustment device 106 can include an actuator configured to extend and retract in order to affect change in the angle 108. Additionally or alternatively, the adjustment device 106 can be a threaded screw assembly configured to extend and retract in order to affect change in the angle 108. The adjustment device 106 is mechanically linked to the spreader assembly 98.

The application device 100 can be movingly linked to the reservoir housing 80 and can be moved by an actuator 110 to adjust and define an outlet gap 74. A control signal can be utilized to controllably connect the actuator 110 with the computing system 66. The layer 78 has a build thickness 112 that is the distance between the surface of the resin R and the base of the resin R which is in contact with the resin surface 34 of the resin support 26, which may be generally equal to the outlet gap 74. Accordingly, the thickness of the resin layer 78 can be adjusted by a control action such as movement of the application device 100 in response to control signals from the computing system 66. In various embodiments, suitable control signals can be electrical, pneumatic, sonic, electromagnetic, a combination thereof, and/or any other type of signal. In addition, other suitable control actions include varying the speed of the resin support 26, adjusting the viscosity or other rheological property of the resin R, changing the width of the deposited resin layer 78 such as by the repositioning of side dams.

Continuing to refer to a FIGS. 2 and 3, a sensor 114 can be positioned downstream of the application device 100 and/or the downstream wall 86. As represented in FIGS. 2 and 3, the sensor 114 can be configured to generate data indicative of the thickness of the deposited resin layer 78 and to transmit such data to the computing system 66. Additionally or alternatively, the sensor 114 may be positioned upstream of the application device 100 and/or the downstream wall 86. In such instances, the sensor 114 may be configured to generate data indicative of the resin R within the deposition assembly 42. The sensor 114 may be embodied as one or more confocals, imaging sensors, or any other vision-based devices. The sensor 114 may additionally and/or alternatively be configured as any other practicable proximity sensor, such as, but not limited to, an ultrasonic sensor, a radar sensor, a LIDAR sensor, or the like. It will be appreciated that the sensor 114 may additionally or alternatively be configured as a pressure sensor and/or any other type of sensor that is configured to generate data indicative of an amount of force on the application device 100.

The computing system 66 is configured to receive the data and process such data using predetermined algorithms to generate control signals for controlling the thickness of the deposited resin layer 78. In this manner, closed loop control of the thickness of the deposited resin layer 78 can be achieved. Optionally, when the sensor 114 indicates that the layer 78 is too thin additional resin R can be added to increase the thickness of the layer 78.

Additionally or alternatively, in some instances, based on the data, the computing system 66 may use predetermined algorithms to detect any varied thickness 118 within the deposited resin layer 78. The varied thickness 118 may be formed due to agglomerates 120, partially cured resin pieces, and/or other foreign objects being retained within the deposition assembly 42, which can lead to defects within the component 12. As such, the deposition assembly 42 may perform a flush operation to move the agglomerates 120, partially cured resin pieces, and/or other foreign objects downstream of the deposition assembly 42.

Figure 4:
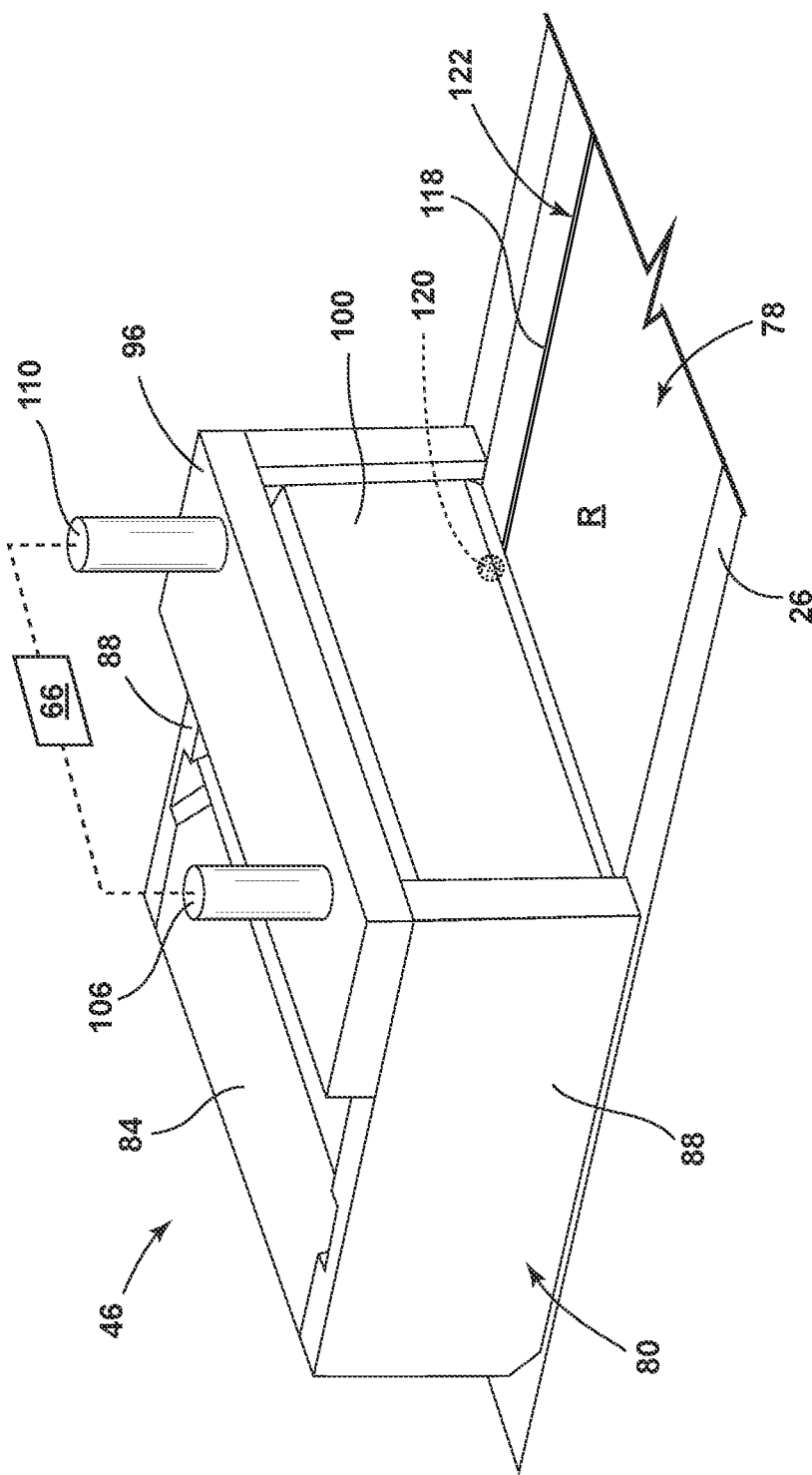
FIG. 4 is a perspective view of a deposition assembly having an application device and an agglomerate upstream of the application device in accordance with various aspects of the present disclosure.

Referring now to FIGS. 4-7, in some instances, the agglomerate 120 may be of a size that is greater than the build thickness 112 of the resin R, which may be defined by the distance between the application device 100 and the resin support 26. As such, the agglomerate 120 may be prevented from moving downstream of the application device 100 as the resin support 26 is translated and the application device 100 is in the first position $P_1$. With the agglomerate 120 upstream of the application device 100, a varied thickness 118 may be formed within the resin. The varied thickness 118 may be any unwanted or unplanned variation in resin from a build thickness 112. For example, as illustrated in FIG. 4, the agglomerate 120 may cause a streak pattern 122 in the layer 78 of resin R.

Figure 5:
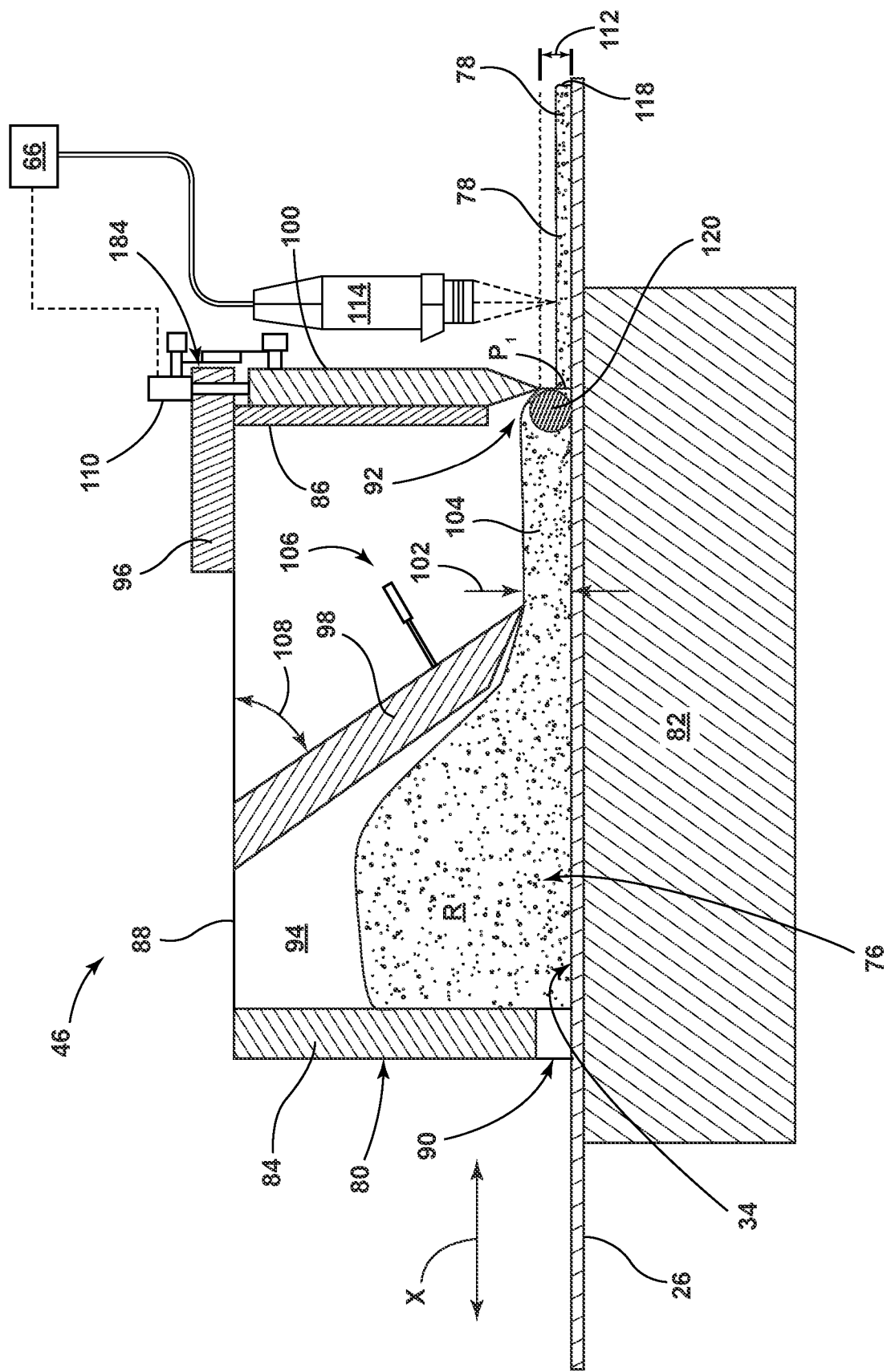
FIG. 5 is a side schematic view of the deposition assembly having the application device in a first position and the agglomerate upstream of the application device in accordance with various aspects of the present disclosure.

As illustrated in FIG. 5, the agglomerate 120 may be positioned upstream of the application device 100, which can cause the streak pattern 122 in the layer 78 of resin. As shown, the streak pattern 122 may be a varied thickness 118 of the resin from the build thickness 112, which may be defined as the distance between the application device 100 and the resin support 26.

Figure 6:
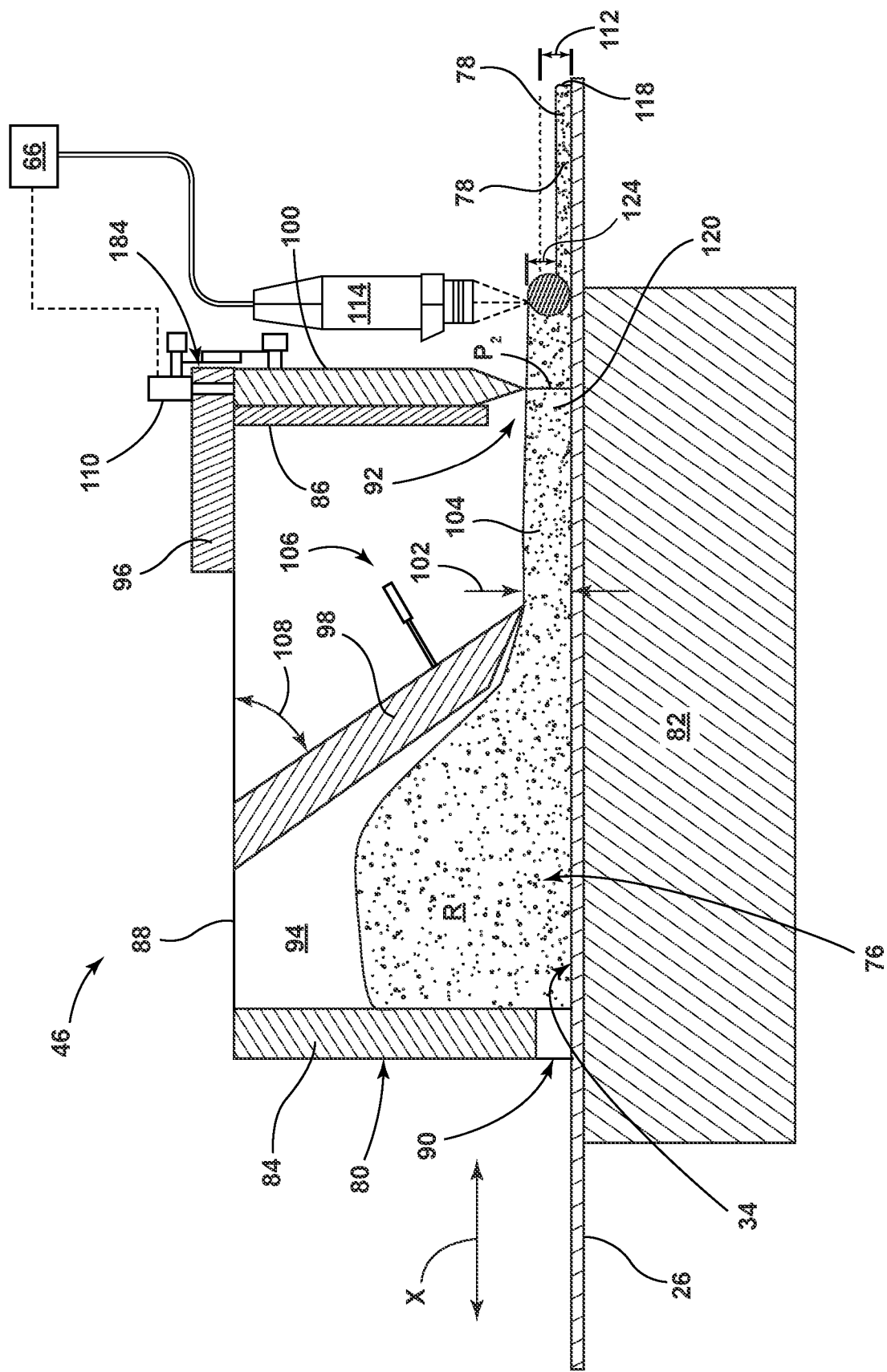
FIG. 6 is a side schematic view of the deposition assembly having the application device in a second position and the agglomerate downstream of the application device in accordance with various aspects of the present disclosure.

As illustrated in FIG. 6, in order to remedy the varied thickness 118, a flush operation may be initiated by the computing system 66. In various embodiments, during the flush operation, a flush thickness 124 of the resin layer 78 as the resin passes the application device 100 may be increased from a build thickness 112 to a flush thickness 124. For instance, the flush operation may be accomplished by providing a control action to the application device 100, such as upward movement of the application device 100 from a first position $P_1$ (FIG. 5) to a second position $P_2$ in response to control signals from the computing system 66. As used here, the "first position" is defined by the application device 100 being a first distance from the resin surface 34 of the resin R and the "second position" is defined by the application device 100 being a second distance from the resin surface 34 of the resin R. With the application device 100 raised to the second position $P_2$, the drive system 28 may translate the resin support 26 with additional resin thereon to move the agglomerates 120, partially cured resin pieces, and/or other foreign objects downstream of the deposition assembly 42.

Figure 7:
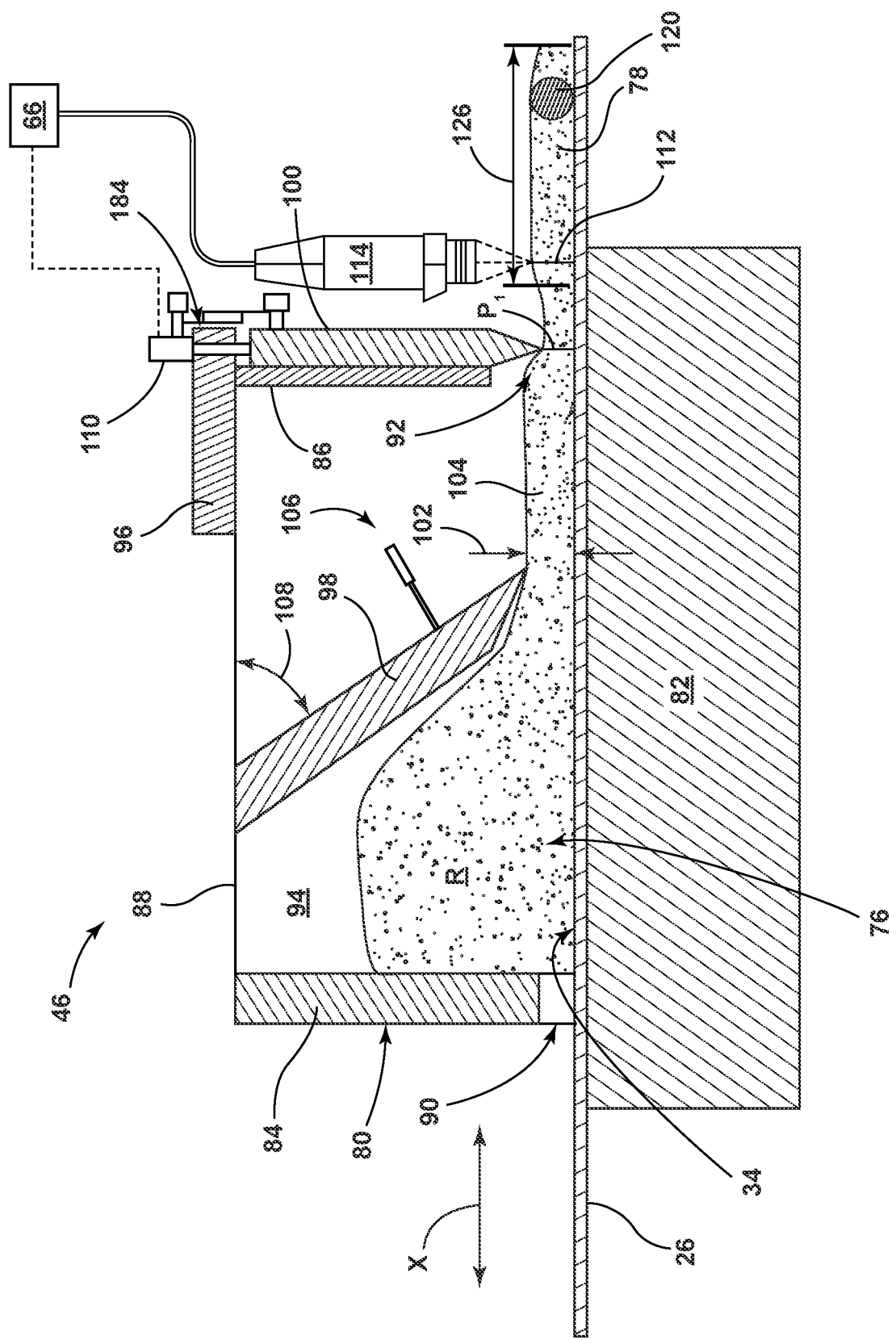
FIG. 7 is a side schematic view of the deposition assembly having the application device in a first position and the agglomerate downstream of the application device in accordance with various aspects of the present disclosure.

Once the resin support 26 is translated a predefined distance and/or the resin support 26 is translated for a defined time period, the application device 100 may be returned to the first position $P_2$, as generally illustrated in FIG. 7. In such instances, a portion of the resin R supported on the resin support 26 may have a varied thickness 118, which may be referred to as a flush zone 126. The flush zone 126 may have a length in the X-axis direction that is generally equal to a translational distance of the resin support 26 while the application device 100 is in the second position $P_2$. Further, the computing system 66 may store the location of the flush zone 126 within the apparatus 10. In various embodiments, the computing system 66 may translate the resin support 26 such that the flush zone 126 may be positioned upstream and/or downstream of the one or more stages 18 (or one or more build zones 40) so that the flush zone 126 is not used to form a layer of the component 12 (FIG. 1).

In some embodiments, the flush operation may be initiated by the computing system 66 at predefined periods. For example, the flush operation may be initiated by the computing system 66 after a predefined number of translations are performed, with each translation providing a new layer 78 of resin R to the one or more build zones 40 (FIG. 1) to be used for an additional layer of the component 12.

Additionally or alternatively, the flush operation may be initiated by the computing system 66 when a varied thickness 118 is detected. For example, as provided herein, the sensor 114 may provide data to the computing system 66 relating to a thickness of the resin layer 78 downstream of the application device 100. In such instances, when the data provided from the sensor 114 to the computing system 66 indicate that there is a varied thickness 118 in the resin layer 78, the application device 100 can be adjusted by a control action that causes movement of the application device 100 in response to control signals from the computing system 66. In addition, other suitable control actions include varying the speed of the resin support 26, adjusting the viscosity or other rheological property of the resin R, changing the width of the deposited resin layer 78 such as by the repositioning of side dams.

Referring to FIGS. 8-14, various illustrations of the deposition assembly 42 including a second application device 128 are provided in accordance with various aspects of the present disclosure. It will be appreciated that the deposition assembly 42 provided in FIGS. 8-14 can include any feature of any other figure described herein without departing from the scope of the present disclosure.

As illustrated, in some embodiments, the first application device 100 can be independently movable from the second application device 128 with the first application device 100 being upstream of the second application device 128. As illustrated, the second application device 128 may be configured in a generally similar manner as the first application device 100. As such, the second application device 128 can be movingly linked to the reservoir housing 80 and can be moved by an actuator 130 to adjust and define an outlet gap 132. The actuator 130 may be operably coupled with the computing system 66. The second application device 128 can define a thickness that is generally equal to the distance between the resin surface 34 of the resin support 26 and the second application device 128. As provided herein, the thickness of the resin layer 78 can be adjusted by a control action that causes movement of the second application device 128 in response to control signals from the computing system 66. In various embodiments, suitable control signals can be electrical, pneumatic, sonic, electromagnetic, a combination thereof, and/or any other type of signal. In addition, other suitable control actions include varying the speed of the resin support 26, adjusting the viscosity or other rheological property of the resin R, changing the width of the deposited resin layer 78 such as by the repositioning of side dams.

In various embodiments, each of the spreader assembly 98, the first application device 100, and/or the second application device 128 may be actuated independently of one another. As such, the spreader assembly 98 may be configured to define a first thickness, the first application device 100 may define a second thickness, and the second application device 128 may define a third thickness. At various times during operation, the second thickness may be greater than, less than, or equal to the third thickness. Moreover, each of the first thickness, the second thickness, and/or the third thickness may be capable of defining the build thickness 112.

Figure 8:
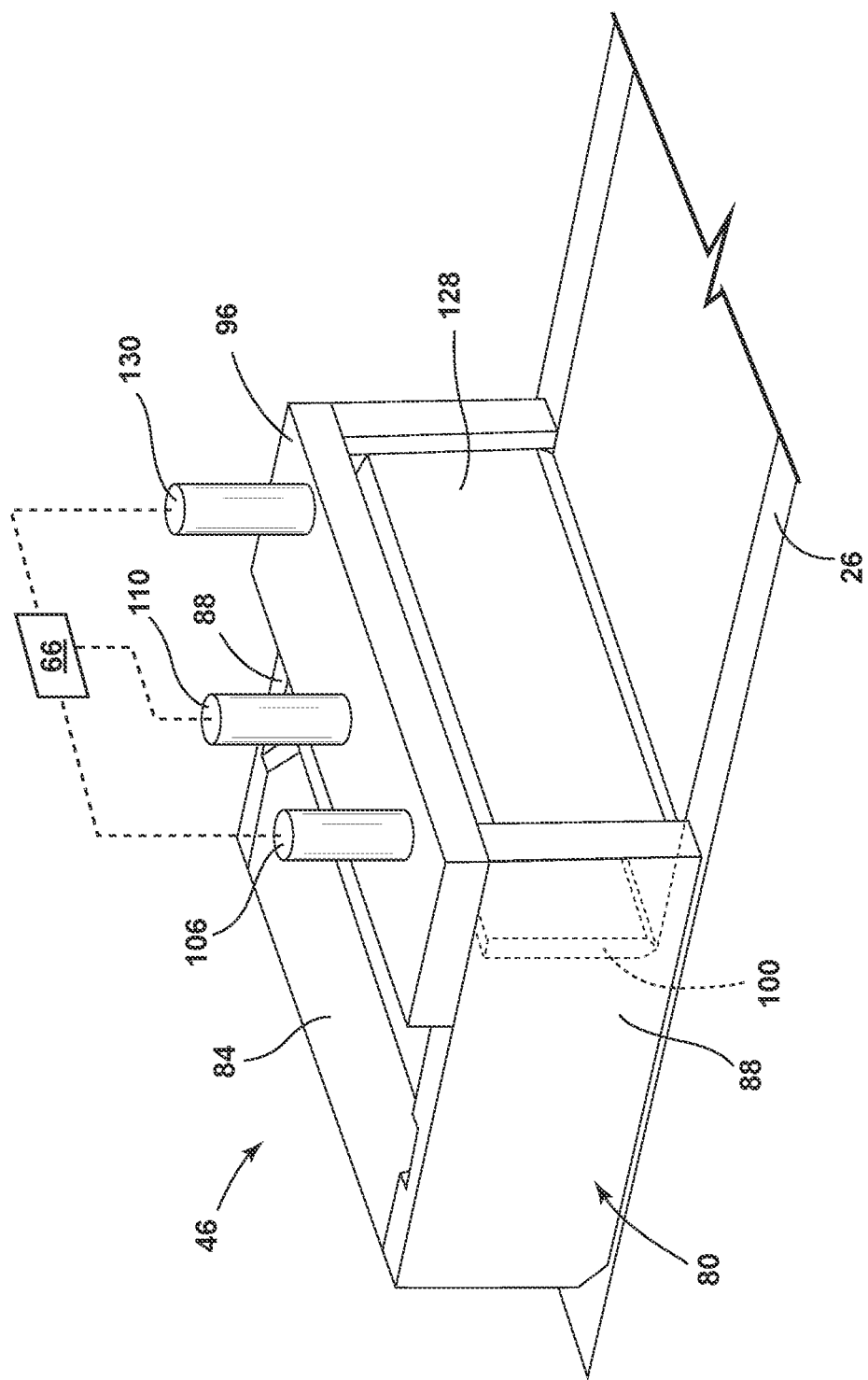
FIG. 8 is a side perspective view of a deposition assembly having first and second application devices in accordance with various aspects of the present disclosure.
Figure 9:
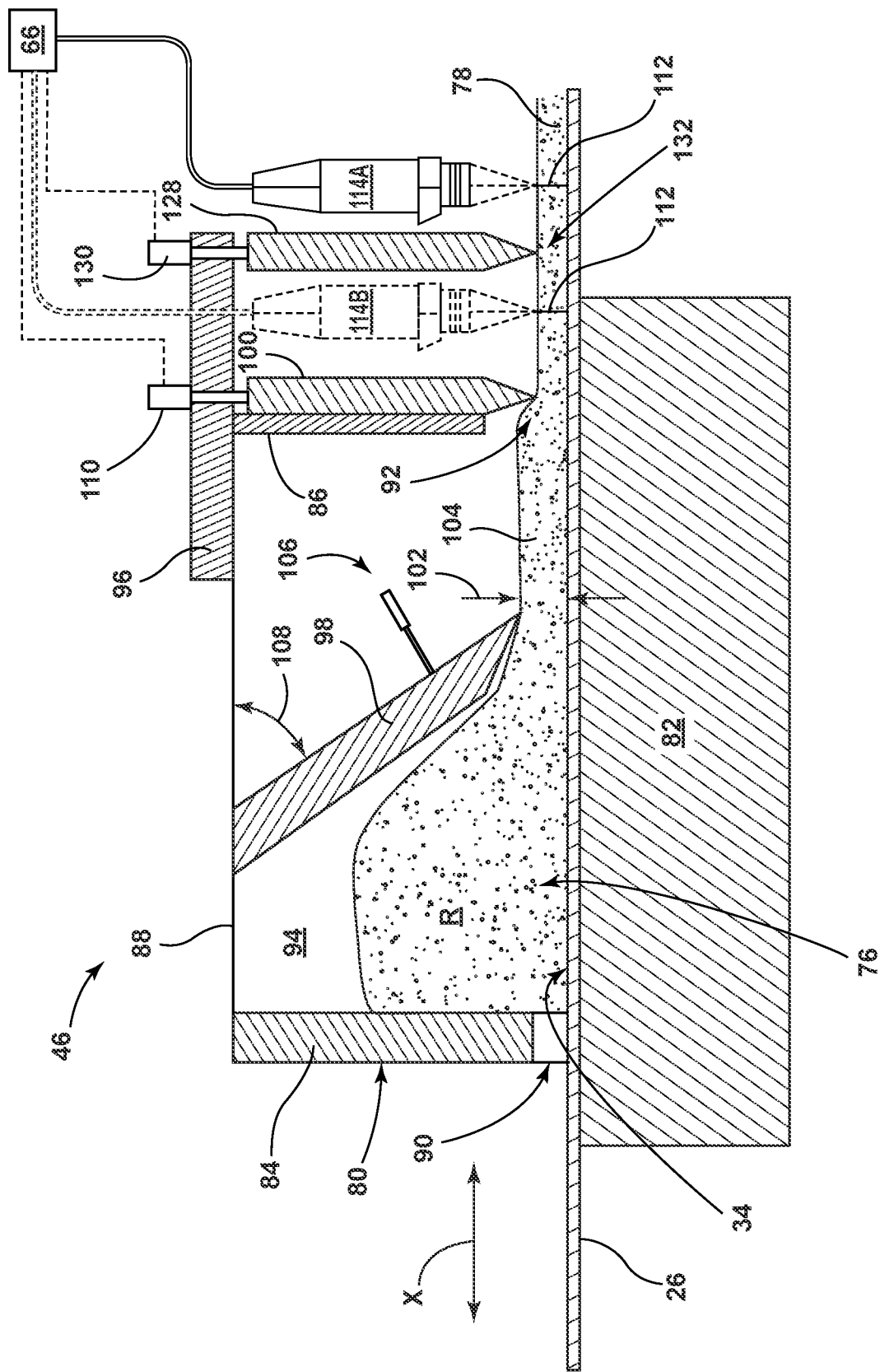
FIG. 9 is a side schematic view of the deposition assembly having the first and second application devices in accordance with various aspects of the present disclosure.

As generally illustrated in FIGS. 8 and 9, the sensor 114 may be positioned downstream of each of the first application device 100 and/or the second application device 128. However, the sensor 114 may be positioned between the first application device 100 and the second application device 128.

In addition, in some examples, a first sensor 114A may be positioned downstream of the second application device 128 and a second sensor 114B may be positioned between the first application device 100 and the second application device 128. Each of the first sensor 114A and/or the second sensor 114B can be configured to generate data indicative of the thickness of the deposited resin layer 78 and to transmit such data to the computing system 66. The first sensor 114A and/or the second sensor 114B may be embodied as one or more confocals, imaging sensors, or any other vision-based devices. The first sensor 114A and/or the second sensor 114B may additionally and/or alternatively be configured as any other practicable proximity sensor, such as, but not limited to, an ultrasonic sensor, a radar sensor, a LIDAR sensor, or the like.

Figure 10:
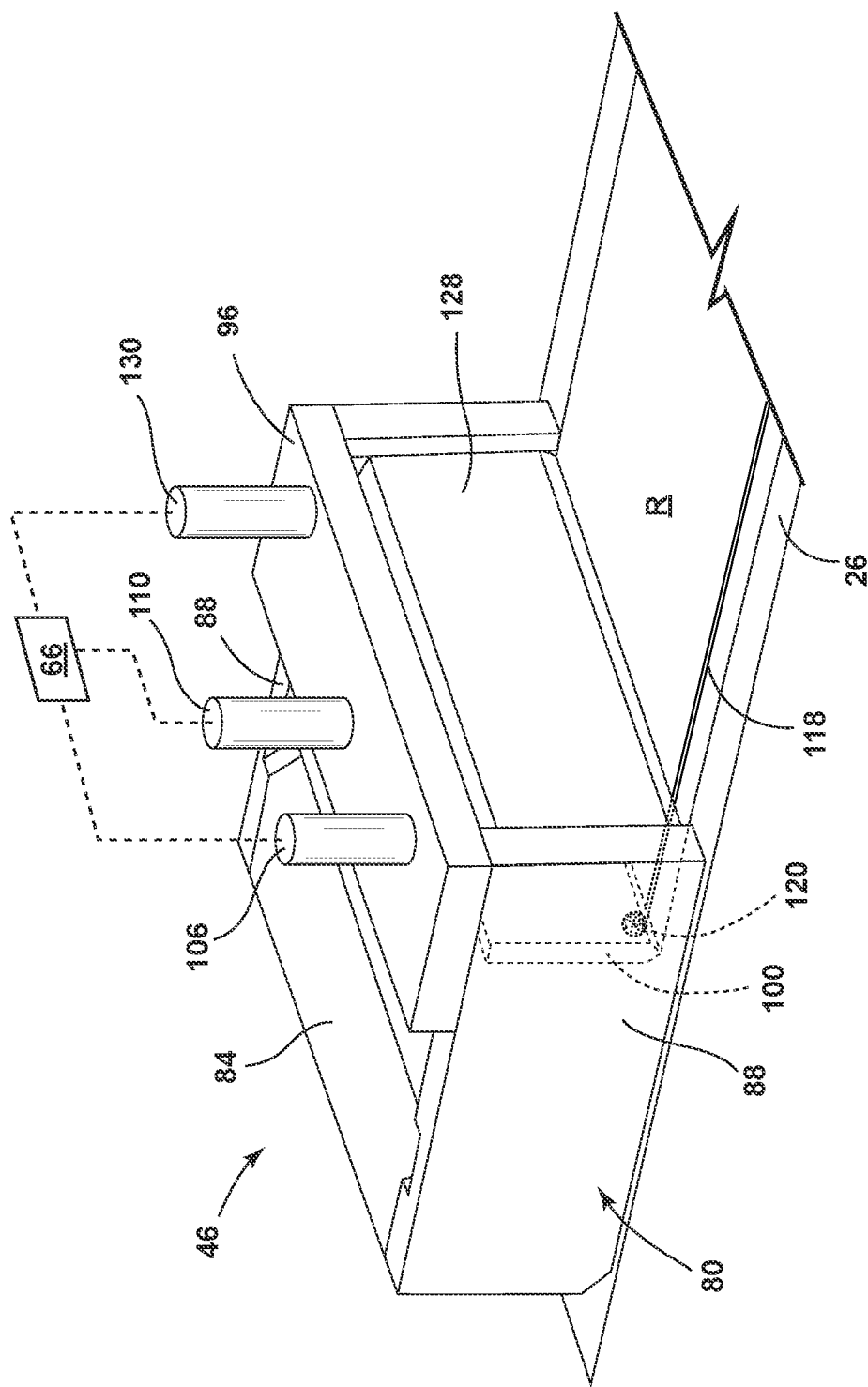
FIG. 10 is a perspective view of the deposition assembly having an agglomerate upstream of the first application device in accordance with various aspects of the present.
Figure 11:
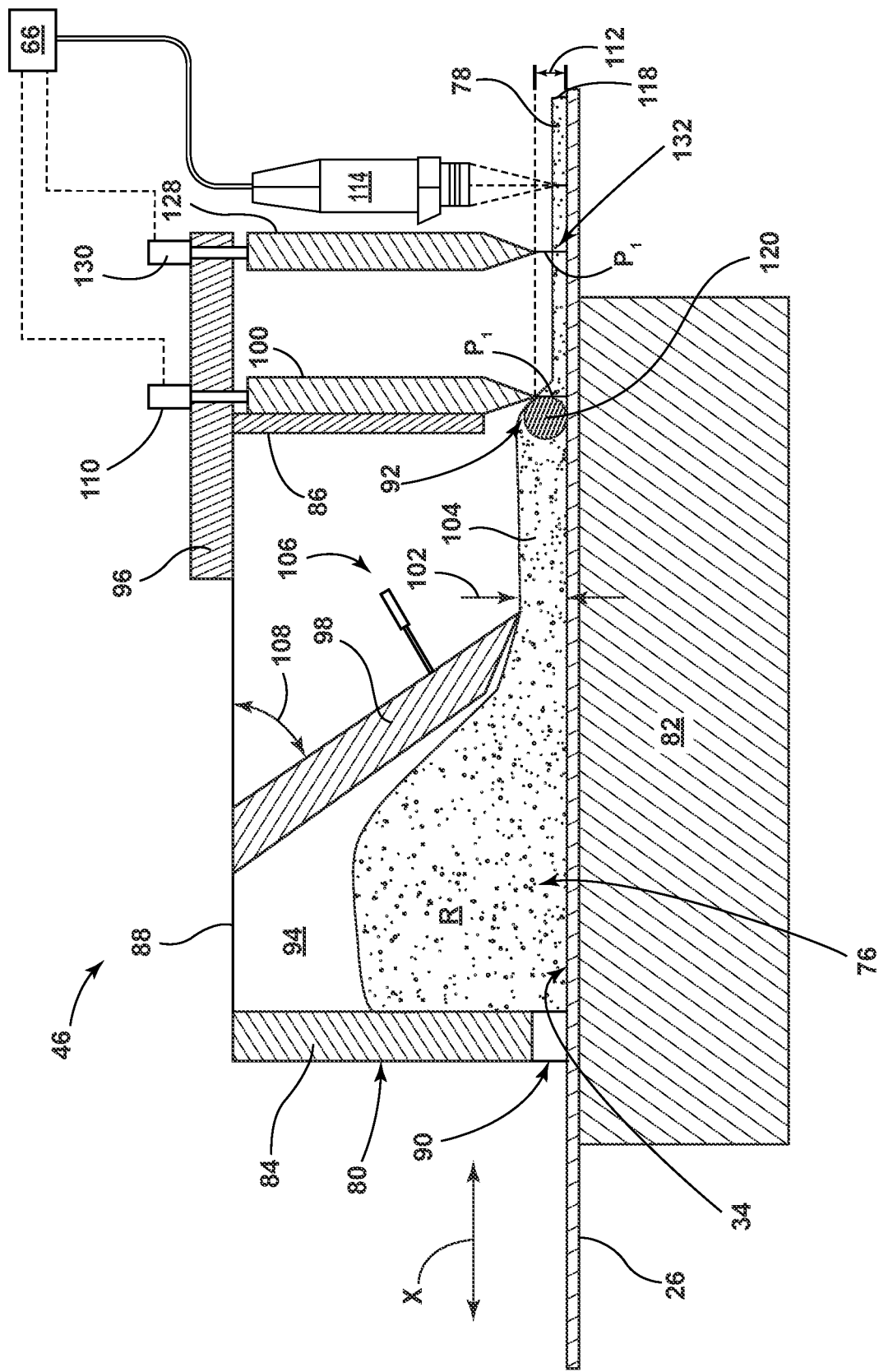
FIG. 11 is a side schematic view of the deposition assembly having the agglomerate upstream of the first application device in accordance with various aspects of the present.

Referring to FIGS. 10-14, in some instances, a flush operation may be initiated by the computing system 66 to move an agglomerate 120 positioned upstream of the first application device 100 to a position downstream of the second application device 128. As illustrated in FIGS. 10 and 11, the agglomerate 120 may have a size that is greater than the build thickness 112 defined between the first application device 100 and the resin support 26. In such instances, the agglomerate 120 may cause a varied thickness 118 in resin thickness downstream of the deposition assembly 42.

Figure 12:
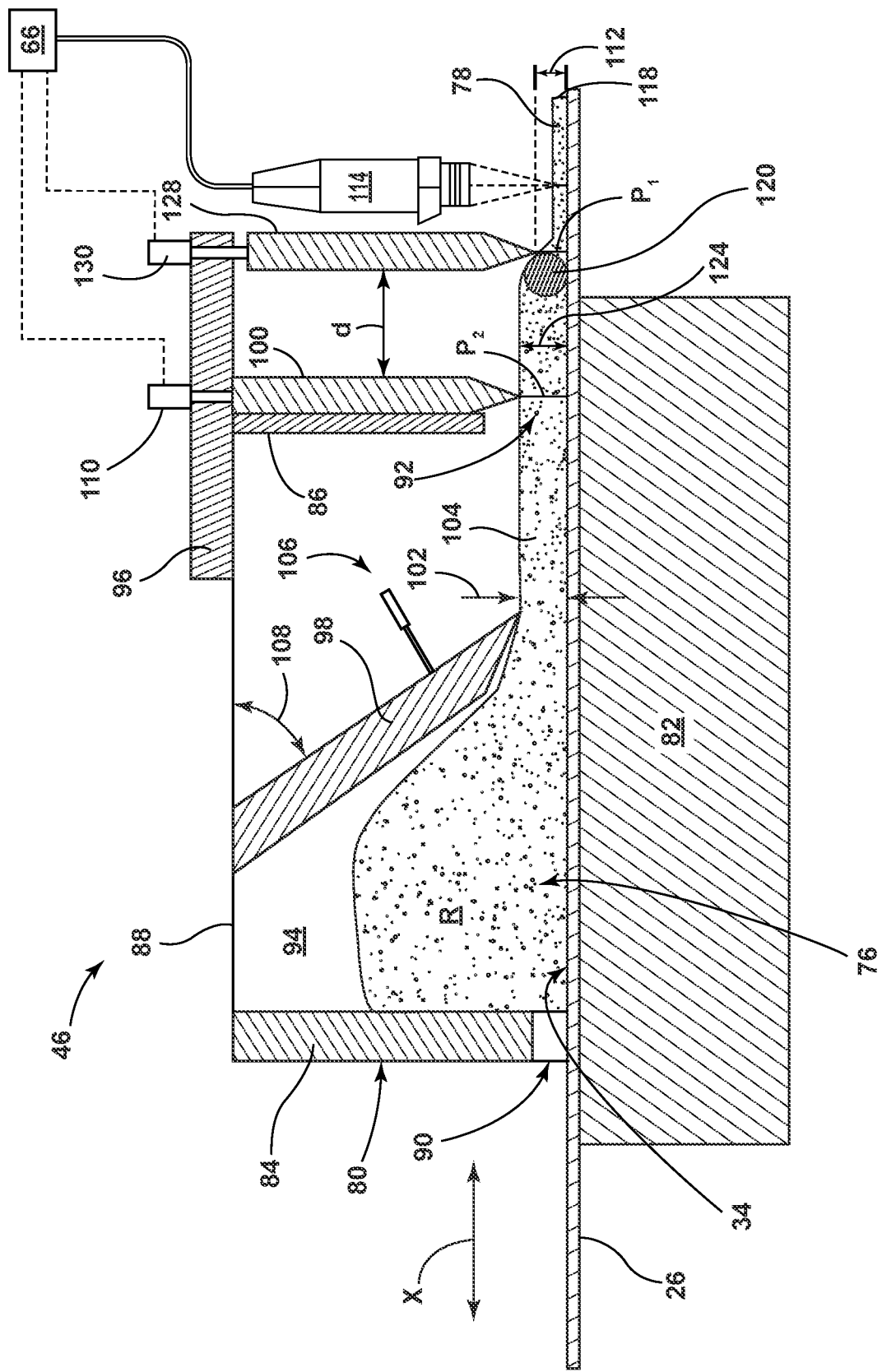
FIG. 12 is a side schematic view of the deposition assembly having the agglomerate downstream of the first application device and upstream of the second application device in accordance with various aspects of the present.

Referring further to FIG. 12, to remove the agglomerate 120 from the deposition assembly 42, the flush operation may include adjusting the first application device 100 by a control action in response to control signals from the computing system 66. In such instances, the control action may include upward movement of the first application device 100 from a first position $P_2$ (FIG. 11) to a second position $P_2$, which allows for a flush thickness 124 of resin to pass under the first application device 100 as the resin support 26 is translated. In some instances, the second application device 128 may be maintained in a first position $P_1$ to define the resin layer 78 passing thereunder at the third thickness. As such, a distance between the first application device 100 and the resin support 26 may be greater than a distance between the second application device 128 and the resin support 26. In such instances, as generally illustrated in FIG. 12, the agglomerate 120 may be translated downstream of the first application device 100 and be retained upstream of the second application device 128.

Figure 13:
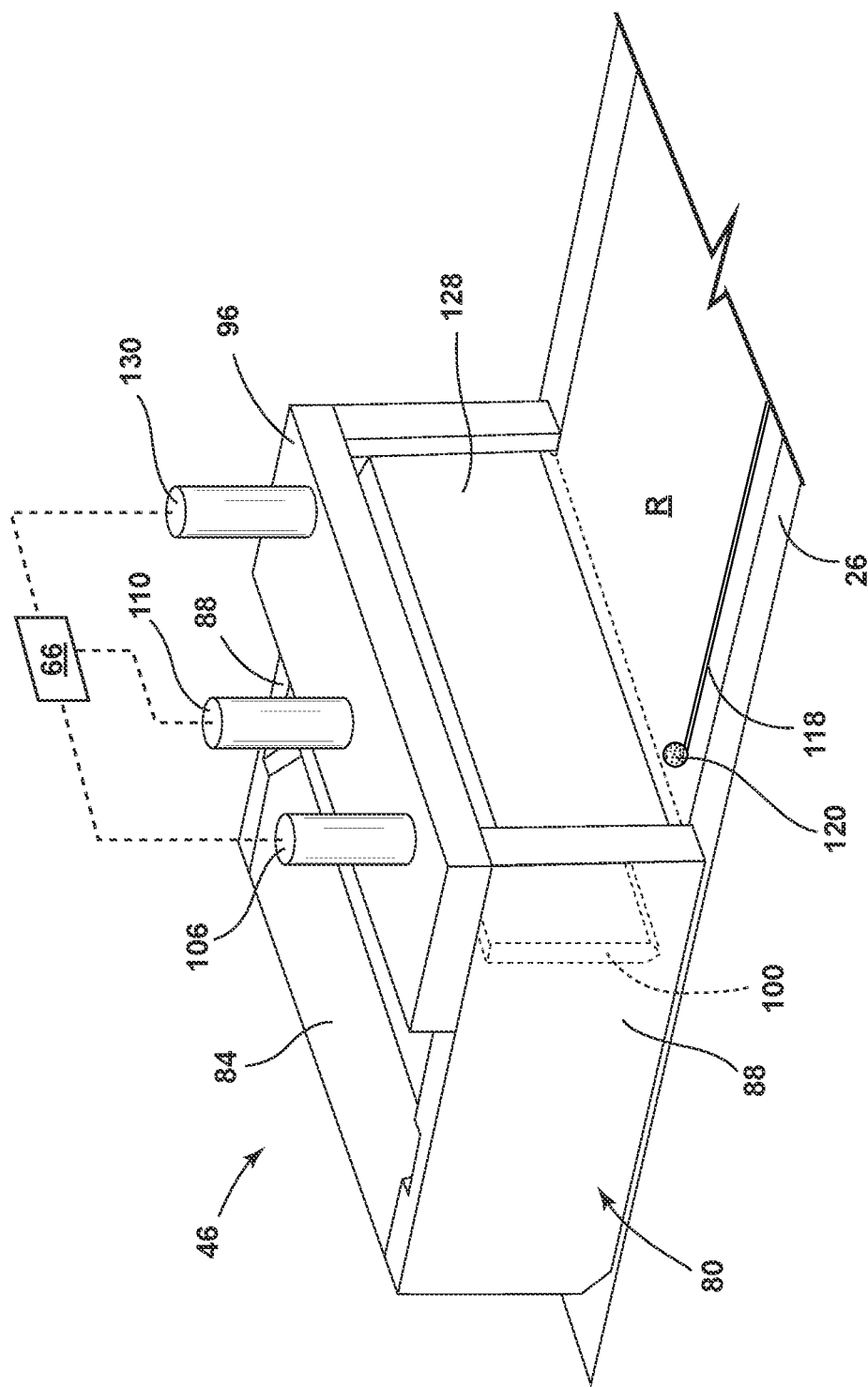
FIG. 13 is a perspective view of the deposition assembly having the agglomerate downstream of the first and second application devices in accordance with various aspects of the present.
Figure 14:
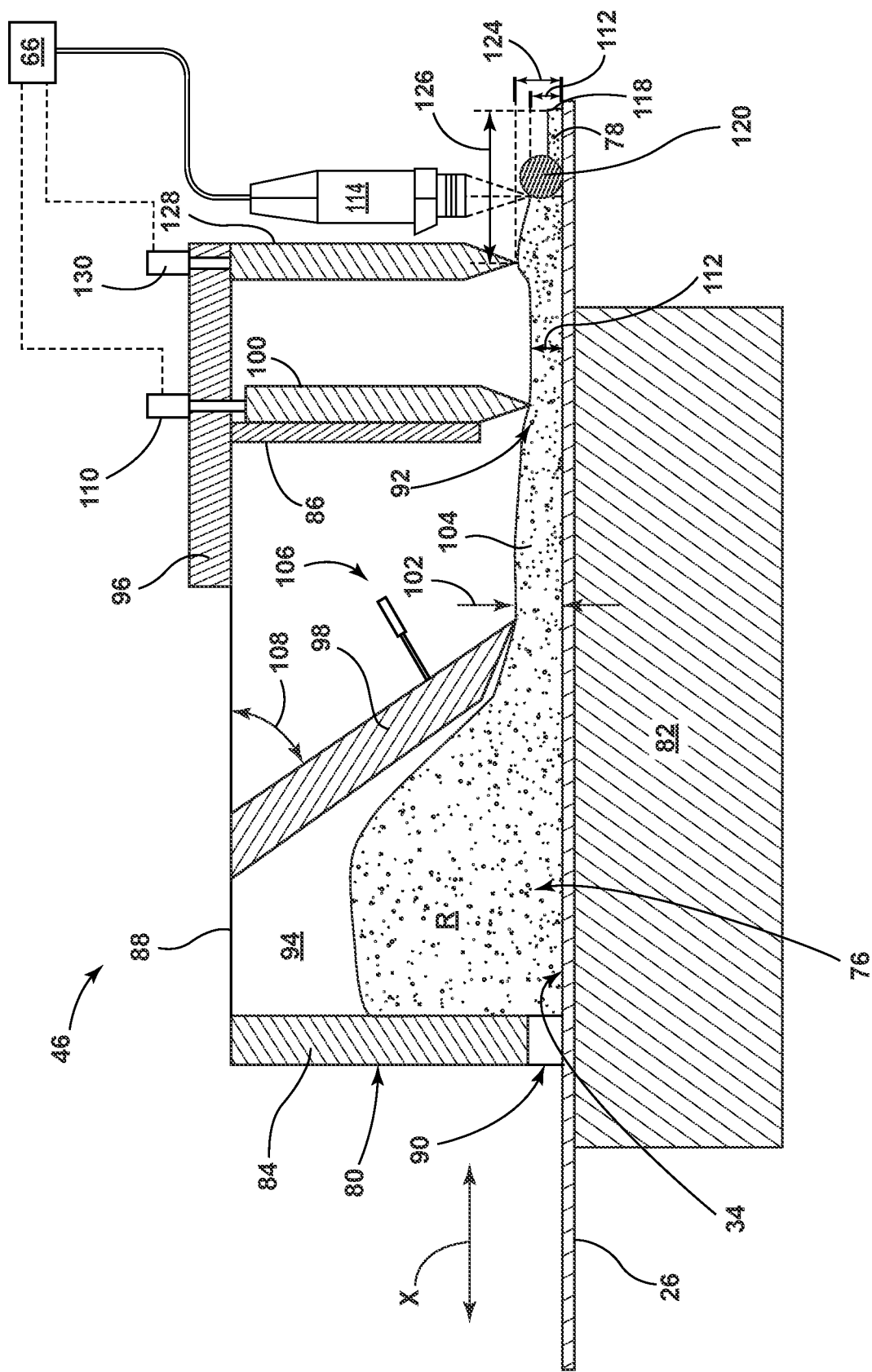
FIG. 14 is a side schematic view of the deposition assembly having the agglomerate downstream of the first and second application devices in accordance with various aspects of the present.
Figure 15:
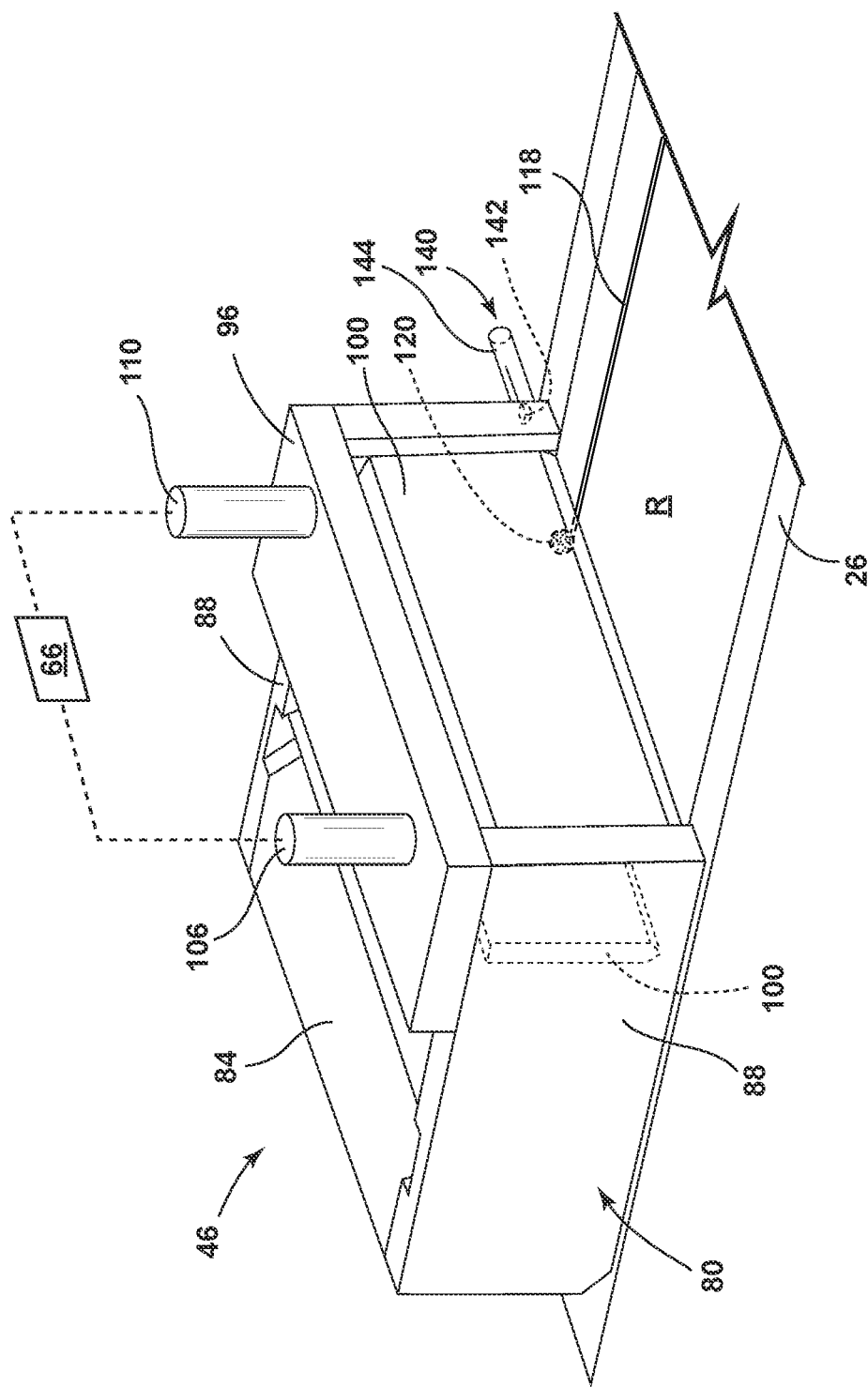
FIG. 15 is a perspective view of a deposition assembly having an application device and an agglomerate upstream of the application device in accordance with various aspects of the present disclosure.

As shown in FIGS. 13 and 14, once the resin support 26 is translated for a predefined time period and/or a predefined distance, the first application device 100 may return to the first position P from the second position $P_2$ to the first position $P_1$. In addition, the flush operation may include adjusting the second application device 128 by a control action in response to control signals from the computing system 66.

In such instances, the control action may include upward movement of the second application device 128 from the first position $P_1$ to the second position $P_2$, which allows for the flush thickness 124 of resin to translate downstream of the second application device 128. In such instances, the agglomerate 120 may also be translated downstream of the second application device 128. Once the resin support 26 is translated for a predefined time period and/or a predefined distance, the second application device 128 may return to a lower, first position $P_1$. In some instances, by offsetting the time periods that the first application device 100 and the second application device 128 are moved between the first and second positions $P_2$. $P_2$ during the flush operation, an amount of resin that is removed from the deposition assembly 42 during the flush operation may be reduced when compared to implementations that include a single moveable first application device 100 during the flush operation.

In some instances, the computing system 66 can be configured to retain the first application device 100 in the second position $P_2$ while the resin support 26 is translated a translational distance that is less than or generally equal to an offset distance d between the first actuatable device and the second actuatable device. As such, an area of the flush zone 126 may be reduced and/or minimized as the agglomerate 120 may move from a position upstream of the first application device 100 to a position upstream of the second application device 128.

It will be appreciated that, in some embodiments, the spreader assembly 98 may also be actuated through control signals provided from the computing system 66 during the flush operation. In instances in which the spreader assembly 98 is also actuated during the flush operation, the spreader assembly 98 may be moved from a first position $P_2$ to a second position $P_2$ prior to movement of the first application device 100 and/or the second application device 128.

Referring now to FIGS. 15-18, various illustrations of the deposition assembly 42 including a wiper assembly 140 are provided in accordance with various aspects of the present disclosure. It will be appreciated that the deposition assembly 42 provided in FIGS. 15-18 can include any feature of any other figure described herein without departing from the scope of the present disclosure.

As provided herein, an agglomerate 120 may be positioned upstream of the application device 100, which can cause the streak pattern 122 in the layer 78 of resin R. As shown, the streak pattern 122 may be a variation in the thickness of the resin from a build thickness 112 to a varied thickness 118. In order to remedy the varied thickness 118, a flush operation may be initiated by the computing system 66. In various embodiments, during the flush operation, the thickness of the resin as the resin passes the application device 100 may be increased from the build thickness 112 to a flush thickness 124. For instance, a flush operation of the resin may be accomplished by providing a control action to the application device 100, such as upward movement of the application device 100 from a first position P/to a second position $P_2$. With the application device 100 raised to the second position $P_2$, the drive system 28 may translate the resin support 26 with additional resin thereon to move the agglomerates 120, partially cured resin pieces, and/or other foreign objects downstream of the deposition assembly 42.

In addition, with the application device 100 in the raised position, a wiper assembly 140 may translate a scraper 142 along the application device 100 to remove at least a portion of resin, agglomerates 120, partially cured resin pieces, and/or other foreign objects that may be coupled and movable with the application device 100. It will be appreciated, however, that the scraper 142 may be translated along the application device 100 when the application device 100 is in any position.

As illustrated, in some embodiments, the wiper assembly 140 may be operably coupled with the reservoir housing 80. The wiper assembly 140 may include an actuator 144 operably coupled with a scraper 142. The actuator 144 may be configured to change a relative position of the scraper 142 relative to application device 100, the second application device 128 (FIG. 9) (when present), the reservoir housing 80, and/or any other module of the apparatus 10. In some examples, the application device 100 (and/or the second application device 128 (FIG. 9)) may be movable along the Z-axis direction. The actuator 144 of the wiper assembly 140 may be configured to translate the scraper 142 along the Y-axis direction. The actuator 144 may be configured as a ballscrew electric actuator, linear electric actuator, pneumatic cylinder, hydraulic cylinder, delta drive, or any other practicable device may additionally or alternatively be used for this purpose.

The scraper 142 is configured to remove at least a portion of the resin that remains on the application device 100 when the application device 100 is moved from the first position $P_1$ to the raised, second position $P_2$. In some instances, the scraper 142 may at least partially be formed from an elastomeric material, a polymeric material, a metallic material, a combination thereof, and/or any other material.

Figure 16:
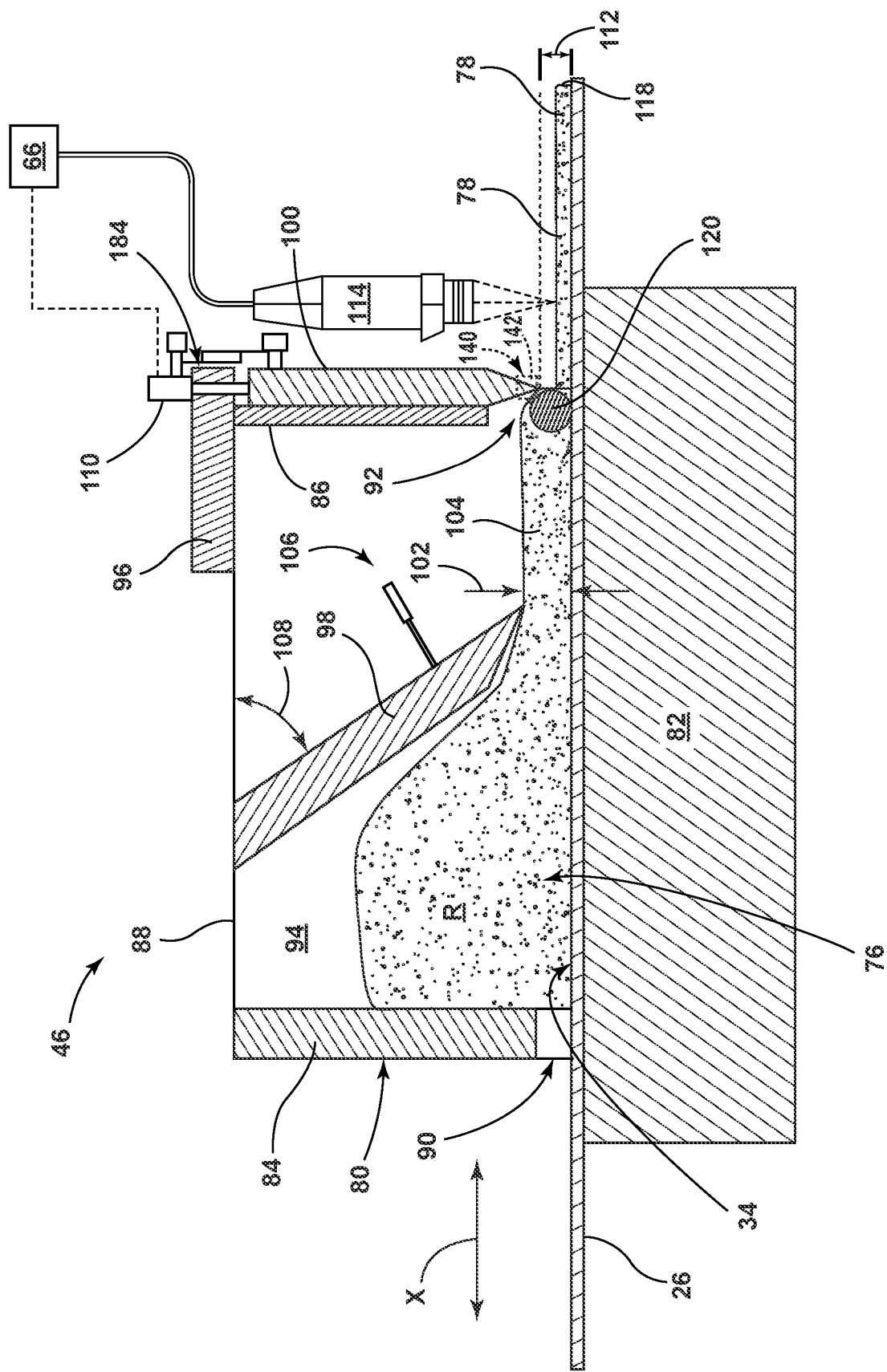
FIG. 16 is a side schematic view of the deposition assembly having the application device in a first position and the agglomerate upstream of the application device in accordance with various aspects of the present disclosure.
Figure 17:
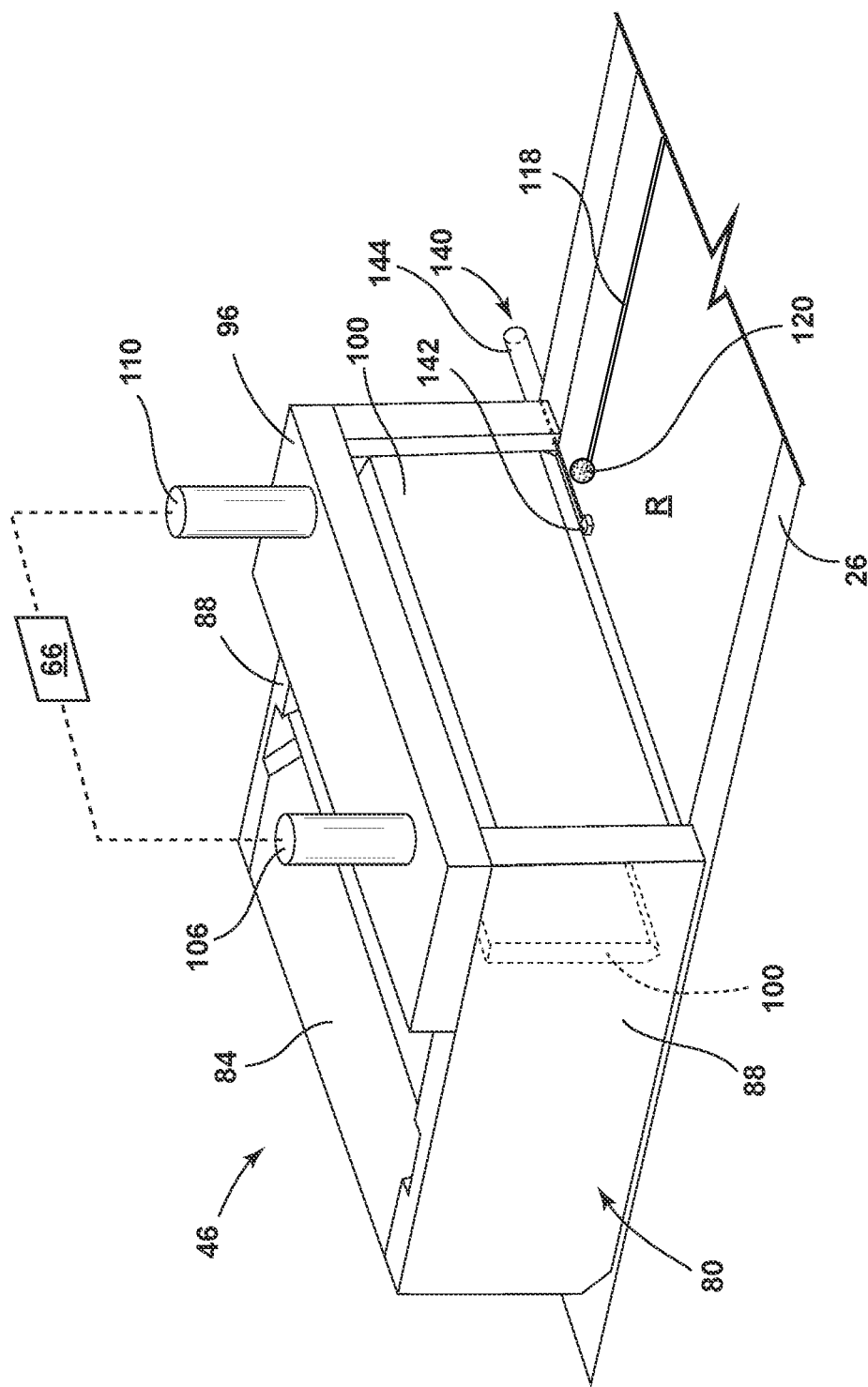
FIG. 17 is a perspective view of the deposition assembly having the application device in a second position and the agglomerate downstream of the application device in accordance with various aspects of the present disclosure.
Figure 18:
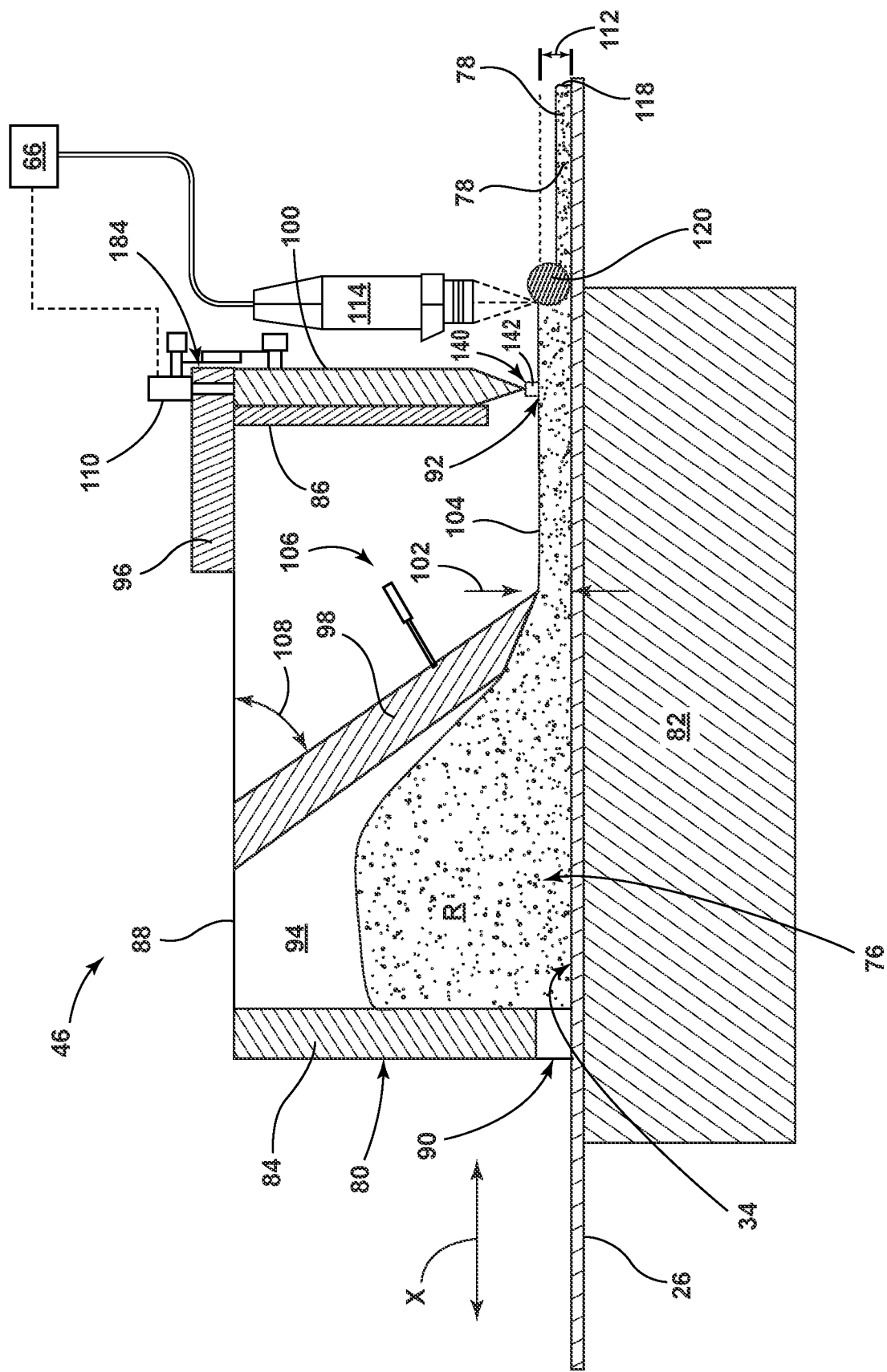
FIG. 18 is a side schematic view of the deposition assembly having the application device in a first position and the agglomerate downstream of the application device in accordance with various aspects of the present disclosure.

Once the resin support 26 is translated a predefined distance and/or the resin support 26 is translated for a defined time period, the application device 100 may be returned to the first position $P_2$, as generally illustrated in FIG. 16. The flush zone 126 generated by the movement of the application device 100 from the first position $P_1$ to the second position $P_2$ and back to the first position $P_2$ may have a length in the X-axis direction that is generally equal to a translational distance of the resin support 26 while the application device 100 is in the second position $P_2$. Further, the computing system 66 may store the location of the flush zone 126 within the apparatus 10. In various embodiments, the computing system 66 may translate the resin support 26 such that the flush zone 126 may be positioned upstream and/or downstream of the one or more stages 18 (or one more build zones 40) so that the flush zone 126 is not used to form a layer of the component 12 (FIG. 1).

Figure 19:
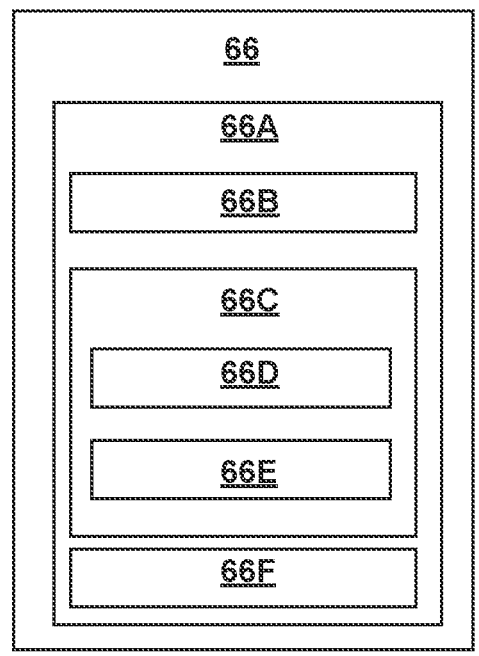
FIG. 19 depicts an exemplary computing system for an additive manufacturing apparatus in accordance with various aspects of the present disclosure.

FIG. 19 depicts certain components of the computing system 66 according to example embodiments of the present disclosure. The computing system 66 can include one or more computing device(s) 66A which may be used to implement the method 200 such as described herein. The computing device(s) 66A can include one or more processor(s) 66B and one or more memory device(s) 66C. The one or more processor(s) 66B can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 66C can include one or more non-transitory computer-readable storage medium(s), such as RAM, ROM, EEPROM, EPROM, flash memory devices, magnetic disks, etc., and/or combinations thereof.

The memory device(s) 66C can include one or more computer-readable media and can store information accessible by the one or more processor(s) 66B, including instructions 66D that can be executed by the one or more processor(s) 66B. The instructions 66D may include one or more steps of the method 200 described herein, such as to execute operations of the additive manufacturing apparatus 10 described above. For instance, the memory device(s) 66C can store instructions 66D for running one or more software applications, displaying a user interface, receiving user input, processing user input, etc. In some implementations, the instructions 66D can be executed by the one or more processor(s) 66B to cause the one or more processor(s) 66B to perform operations, e.g., such as one or more portions of methods described herein. The instructions 66D can be software written in any suitable programming language or can be implemented in hardware. Additionally, and/or alternatively, the instructions 66D can be executed in logically and/or virtually separate threads on processor(s) 66B.

The one or more memory device(s) 66C can also store data 66E that can be retrieved, manipulated, created, or stored by the one or more processor(s) 66B. The data 66E can include, for instance, data to facilitate performance of the method 200 described herein. The data 66E can be stored in one or more database(s). The one or more database(s) can be connected to computing system 66 by a high bandwidth LAN or WAN or can also be connected to the computing system 66 through network(s) (not shown). The one or more database(s) can be split up so that they are located in multiple locales. In some implementations, the data 66E can be received from another device.

The computing device(s) 66A can also include a communication module or interface 66F used to communicate with one or more other component(s) of computing system 66 or the additive manufacturing apparatus 10 over the network(s). The communication interface 66F can include any suitable components for interfacing with one or more network(s), including, for example, transmitters, receivers, ports, controllers, antennas, or other suitable components.

As provided herein, the computing system 66 may be operably coupled with one or more of the adjustment device 106 operably coupled with the spreader assembly 98, the actuator 110 operably coupled with the first application device 100, the actuator 130 operably coupled with the second application device 128, the actuator 144 operably coupled with the scraper 142, and/or a sensor 114 positioned downstream of the application device 100. The computing system 66 may be configured to provide one or control signals to the actuators based on data provided from the one or more sensors.

Figure 20:
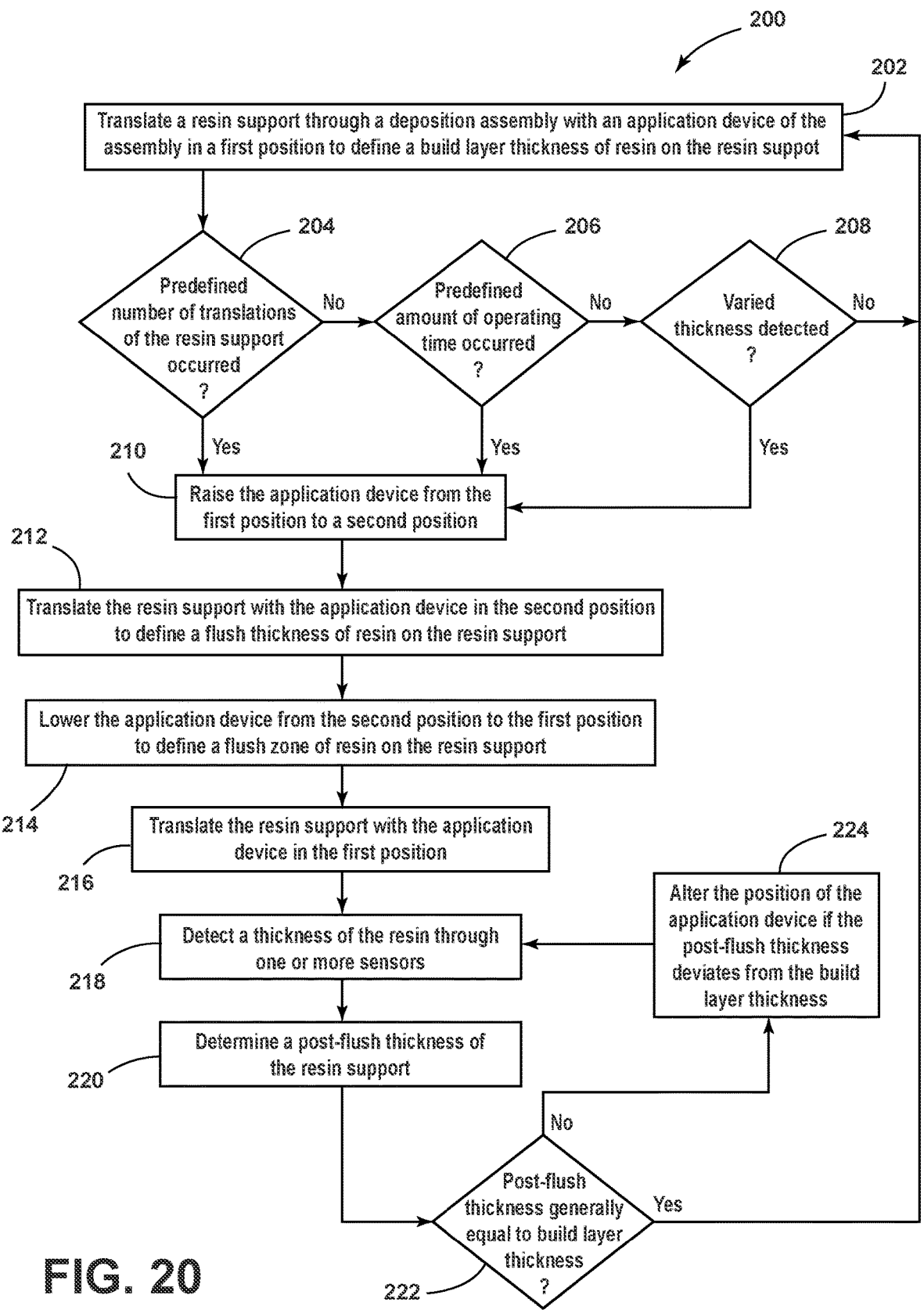
FIG. 20 is a method of operating the manufacturing apparatus in accordance with various aspects of the present disclosure.

Now that the construction and configuration of the additive manufacturing apparatus having one or more accumulators have been described according to various examples of the present subject matter, a method 200 for operating an additive manufacturing apparatus is provided in FIG. 20. In general, the method 200 will be described herein with reference to the additive manufacturing apparatus shown in FIGS. 1-18 and the various system components shown in FIG. 19. However, it will be appreciated that the disclosed method 200 may be implemented with additive manufacturing apparatuses having any other suitable configurations and/or within systems having any other suitable system configuration. In addition, although FIG. 20 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

Referring now to FIG. 20, at step 202, the method 200 includes translating a resin support through a deposition assembly with an application device of the assembly in a first position to define a build thickness of resin on the resin support. As provided herein, the deposition assembly may be any device or combination of devices that is operable to apply a layer of the resin on the resin support. In addition, the deposition assembly can include one or more spreader assemblies and/or application devices that are used to control a thickness of the resin applied to the resin support, as the resin support passes the deposition assembly. In various embodiments, the one or more spreader assemblies and/or application devices may be configured as doctor blades. However, in various embodiments, other material depositing and/or leveling apparatuses can be used separately or in combination with the one or more spreader assemblies and/or application devices, such as, but not limited to, gravure rolls, metering rolls, weir-based cascades, direct die casting, and a combination thereof.

At step 204, the method 200 includes determining if a predefined number of translations of the resin support occurred. As used herein, a "translation" of the resin support may occur prior to the first layer of a component being formed and between each sequential layer of the component. As such, a predefined number of translations may be set by a user and/or by the computing system. If the number of translations is less than to the predefined number, the method 200 continues to step 204. If the number of translations is equal to, or greater than, the predefined number, the method 200 continues to step 210.

At 206, the method includes determining if a predefined amount of operating time has occurred. As used herein, an "operating time" is the time period that the additive manufacturing apparatus is in operation to form one or more components. In various embodiments, the computing system may store the operating time. If the operating time is less than the predefined amount, the method 200 continues to step 208. If the operating time is equal to, or greater than, the predefined amount, the method 200 continues to step 210.

At 208, the method includes determining if a varied thickness of the resin layer is present. As provided herein, a sensor can be positioned downstream of the one or more application devices and can be configured to generate data indicative of the thickness of the deposited resin layer. The data may be transmitted to the computing system. Based on the data, the computing system may use predetermined algorithms to detect any varied thickness within the deposited resin layer. The varied thickness may be formed due to agglomerates, partially cured resin pieces, and/or other foreign objects being retained within the deposition assembly, which can lead to defects within the component. If a varied thickness is not detected based on the data provided by the sensor, the method 200 returns to step 202. If a varied thickness is detected based on the data provided by the sensor, the method 200 continues to step 210.

While shown sequentially, that the predefined conditions illustrated in steps 204, 206, and 208 may be performed simultaneously and/or in any order without departing from the scope of the present disclosure. In addition, it will be appreciated that any predefined condition may be defined, which when occurring, may cause the method to advance to the flush operation described below. In the illustrated method, the flush operation is described in steps 210-224. However, the method provided herein may include any other process or feature described with reference to FIGS. 1-19 without departing from the scope of the present disclosure.

Referring further to FIG. 20, at step 210, as described herein, the deposition assembly may initiate a flush operation to move the agglomerates, partially cured resin pieces, and/or other foreign objects downstream of the deposition assembly by raising the application device from the first position to a second position. At step 212, the method 200 can include translating the resin support with the application device in the second position to define a flush thickness of resin on the resin support. The flush thickness may be a thickness of the resin that is generally equal to the distance between a bottom portion of the application device and the resin surface of the resin support with the application device in the second position. In various examples, the resin support may be translated by a drive system of the additive manufacturing apparatus.

At step 214, the method 200 includes lowering the application device from the second position to the first position to define a flush zone of resin on the resin support. As provided herein, the flush zone may be a portion of the resin on the resin support that is of the flush thickness. In some instances, the application device can be lowered from the second position to the first position after the resin support has been translated a predefined distance. Additionally or alternatively, wherein the application device can be lowered from the second position to the first position after the resin support has been translated for a predefined length of time.

At step 216, the method 200 includes translating the resin support with the application device in the first position. In addition, at step 218, the method 200 includes detecting a thickness of the resin through one or more sensors. The detection may be in the form of data from any practicable sensor. At step 220, the method 200 includes determining a post-flush thickness of the resin support. As provided herein, based on the data, the computing system may use predetermined algorithms to determine the post-flush thickness of the resin support.

At step 222, the method 200 includes determining if the post-flush thickness is generally equal to the build thickness to verify that the application device has returned to the first position. As provided herein, the application device can be movingly linked to the deposition assembly reservoir. As such, during movement of the application device from the first position to the second position and from the second position to the first position, slight variations in positioning may occur, which would be equal to the difference between the build thickness and the post-flush thickness. As such, if the post flush thickness is not generally equal to the build thickness, at step 224, the method 200 can include altering the position of the application device. In some instances, a control signal can be provided to the actuator from the computing system to alter the position of the application device.

If the post flush thickness is generally equal to the build thickness, the method 200 can return to step 202. In some instances, prior to returning to step 202, the flush zone may be translated to a position downstream of the one or more build zones of the additive manufacturing apparatus.

It should be appreciated that the additive manufacturing apparatus is described herein only for the purpose of explaining aspects of the present subject matter. In other example embodiments, the additive manufacturing apparatus may have any other suitable configuration and may use any other suitable additive manufacturing technology. Further, the additive manufacturing apparatus and processes or methods described herein may be used for forming components using any suitable material. For example, the material may be plastic, metal, concrete, ceramic, polymer, epoxy, photopolymer resin, or any other suitable material that may be embodied in a layer of slurry, resin, or any other suitable form of sheet material having any suitable consistency, viscosity, or material properties. For example, according to various embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt-based superalloys (e.g., those available under the name Inconel® available from Special Metals Corporation). These materials are examples of materials suitable for use in the additive manufacturing processes described herein and may be generally referred to as "additive materials."

Further aspects are provided by the subject matter of the following clauses:

An additive manufacturing apparatus comprising: a stage configured to hold a component; a radiant energy device operable to generate and project radiant energy in a patterned image; an actuator configured to change a position of the stage relative to the radiant energy device; and a deposition assembly upstream of the stage and configured to deposit a resin on a resin support, the deposition assembly comprising: a reservoir housing configured to retain a volume of the resin between an upstream wall and a downstream wall; an actuatable application device operably coupled with the reservoir housing; and a computing system operably coupled with the application device, the computing system configured to initiate a flush operation, wherein the application device is moved from a first position to a second position during the flush operation.

The additive manufacturing apparatus of one or more of these clauses, wherein the application device is downstream of the downstream wall.

The additive manufacturing apparatus of one or more of these clauses, wherein the application device defines a build thickness of the resin between the application device and the resin support with the application device in the first position and a flush thickness of the resin between the application device and the resin support with the application device in the second position.

The additive manufacturing apparatus of one or more of these clauses, further comprising: a spreader assembly upstream of the application device, wherein the spreader assembly is configured to define an initial thickness of the resin upstream of the application device, and wherein the initial thickness is greater than a build thickness of the resin downstream of the application device.

The additive manufacturing apparatus of one or more of these clauses, wherein the application device includes a first application device and a second application device, the first application device independently movable from the second application device, and wherein the first application device is upstream of the second application device.

The additive manufacturing apparatus of one or more of these clauses, wherein the flush operation is initiated after a predefined number of translations of the resin support.

The additive manufacturing apparatus of one or more of these clauses, further comprising: a sensor positioned downstream of the application device, the sensor configured to provide the computing system with data related to a thickness of the resin downstream of the application device.

The additive manufacturing apparatus of one or more of these clauses, wherein the flush operation is initiated when the computing system determines a varied thickness of the resin is present based on data provided from the sensor.

The additive manufacturing apparatus of one or more of these clauses, further comprising: a wiper assembly operably coupled with the application device, the wiper assembly including a scraper configured to translate along the application device when the application device is in the second position.

The additive manufacturing apparatus of one or more of these clauses, wherein the resin support is configured to generally translate in an X-axis direction, the application device is configured to generally translate in a Z-axis direction, and the scraper is configured to generally translate in a Y-axis direction.

The additive manufacturing apparatus of one or more of these clauses, wherein one or more agglomerates are translated from a position upstream of the application device to a position downstream of the application device when the application device is in the second position and the resin support is translated by a drive system.

The additive manufacturing apparatus of one or more of these clauses, wherein a flush zone is defined on the resin support, and wherein a drive system operably coupled with the resin support is configured to position the flush zone upstream or downstream of the stage when the radiant energy device projects radiant energy towards the component.

A method of operating an additive manufacturing apparatus, the method comprising: translating a resin support through a deposition assembly with an application device of the deposition assembly in a first position to define a build thickness of resin on the resin support; raising the application device from the first position to a second position; and translating the resin support with the application device in the second position to define a flush thickness of the resin on the resin support.

The method of one or more of these clauses, further comprising: lowering the application device from the second position to the first position to define a flush zone of the resin on the resin support.

The method of one or more of these clauses, wherein the application device is lowered from the second position to the first position after the resin support has been translated a predefined distance.

The method of one or more of these clauses, wherein the application device is lowered from the second position to the first position after the resin support has been translated for a predefined length of time.

The method of one or more of these clauses, further comprising: translating the resin support with the application device in the first position; detecting a thickness of the resin through one or more sensors; determining a post-flush thickness of the resin support; and altering a position of the application device if the post-flush thickness deviates from the build thickness.

A deposition assembly for an additive manufacturing apparatus, the deposition assembly comprising: a reservoir housing configured to retain a volume of resin between an upstream wall and a downstream wall; a first actuatable application device operably coupled with the reservoir housing; a second actuatable application device operably coupled with the reservoir housing, the second actuatable application device downstream of the first application device; and a computing system operably coupled with the first application device and the second application device, the computing system configured to intermittently initiate a flush operation between successive layers of a component.

The deposition assembly of one or more of these clauses, wherein the first application device and the second application device are moved from respective first positions to second positions during the flush operation at offset time periods relative to one another.

The deposition assembly of one or more of these clauses, wherein the computing system is configured to retain the first application device in a second position while a resin support is translated a translational distance that is less than an offset distance between the first application device and the second application device.

This written description uses examples to disclose the concepts presented herein, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additive manufacturing apparatus comprising:
   a stage configured to hold a component;
   a radiant energy device operable to generate and project radiant energy in a patterned image;
   an actuator configured to change a position of the stage relative to the radiant energy device; and
   a deposition assembly upstream of the stage and configured to deposit a resin on a resin support, the deposition assembly comprising:
      a reservoir housing configured to retain a volume of the resin between an upstream wall and a downstream wall;
      an application device operably coupled with the reservoir housing, wherein the application device is downstream of the downstream wall;
      a spreader assembly upstream of the application device, wherein the spreader assembly is configured to define an initial thickness of the resin upstream of the application device, and wherein the initial thickness is greater than a build thickness of the resin downstream of the application device; and
a computing system operably coupled with the application device, the computing system configured to initiate a flush operation, wherein the application device is moved from a first position to a second position during the flush operation.

2. The additive manufacturing apparatus of claim 1, wherein the application device defines a build thickness of the resin between the application device and the resin support with the application device in the first position and a flush thickness of the resin between the application device and the resin support with the application device in the second position.

3. The additive manufacturing apparatus of claim 1, wherein the application device includes a first application device and a second application device, the first application device independently movable from the second application device, and wherein the first application device is upstream of the second application device.

4. The additive manufacturing apparatus of claim 1, wherein the flush operation is initiated after a predefined number of translations of the resin support.

5. The additive manufacturing apparatus of claim 1, further comprising:
a sensor positioned downstream of the application device, the sensor configured to provide the computing system with data related to a thickness of the resin downstream of the application device.

6. The additive manufacturing apparatus of claim 5, wherein the flush operation is initiated when the computing system determines a varied thickness of the resin is present based on data provided from the sensor.

7. The additive manufacturing apparatus of claim 1, further comprising:
a wiper assembly operably coupled with the application device, the wiper assembly including a scraper configured to translate along the application device when the application device is in the second position.

8. The additive manufacturing apparatus of claim 7, wherein the resin support is configured to generally translate in an X-axis direction, the application device is configured to generally translate in a Z-axis direction, and the scraper is configured to generally translate in a Y-axis direction.

9. The additive manufacturing apparatus of claim 1, wherein one or more agglomerates are translated from a position upstream of the application device to a position downstream of the application device when the application device is in the second position and the resin support is translated by a drive system.

10. The additive manufacturing apparatus of claim 1, wherein a flush zone is defined on the resin support, and wherein a drive system operably coupled with the resin support is configured to position the flush zone upstream or downstream of the stage when the radiant energy device projects radiant energy towards the component.

11. A deposition assembly for an additive manufacturing apparatus, the deposition assembly comprising:
a reservoir housing configured to retain a volume of resin between an upstream wall and a downstream wall;
a first application device operably coupled with the reservoir housing;
a second application device operably coupled with the reservoir housing, the second application device downstream of the first application device;
a sensor positioned downstream of the first application device and upstream of the second application device based on data from the sensor; and
a computing system operably coupled with the first application device and the second application device, the computing system configured to intermittently initiate a flush operation between successive layers of a component, and wherein an actuation time of the first application device is offset from an actuation time of the second application device, each of the actuation time of the first application device and the actuation time of the second application device based on data from the sensor.

12. The deposition assembly of claim 11, wherein the first application device and the second application device are moved from respective first positions to second positions during the flush operation at offset time periods relative to one another.

13. The deposition assembly of claim 11, wherein the computing system is configured to retain the first application device in a second position while a resin support is translated a translational distance that is less than an offset distance between the first application device and the second application device.

14. An additive manufacturing apparatus comprising:
a stage configured to hold a component;
a radiant energy device operable to generate and project radiant energy in a patterned image;
an actuator configured to change a position of the stage relative to the radiant energy device; and
a deposition assembly upstream of the stage and configured to deposit a resin on a resin support, the deposition assembly comprising:
a reservoir housing configured to retain a volume of the resin between an upstream wall and a downstream wall;
an application device operably coupled with the reservoir housing; and
a computing system operably coupled with the application device, the computing system configured to initiate a flush operation, wherein the application device is moved from a first position to a second position during the flush operation, and wherein an agglomerate upstream of the application device is configured to move with the resin support from a position upstream of the application device to a position downstream of the application device with the application device in the second position.

15. The additive manufacturing apparatus of claim 14, wherein the application device defines a build thickness of the resin between the application device and the resin support with the application device in the first position and a flush thickness of the resin between the application device and the resin support with the application device in the second position.

16. The additive manufacturing apparatus of claim 14, further comprising:
a spreader assembly upstream of the application device, wherein the spreader assembly is configured to define an initial thickness of the resin upstream of the application device, and wherein the initial thickness is greater than a build thickness of the resin downstream of the application device.

17. The additive manufacturing apparatus of claim 14, wherein the application device includes a first application device and a second application device, the first application device independently movable from the second application device, and wherein the first application device is upstream of the second application device.

18. The additive manufacturing apparatus of claim 14, wherein the flush operation is initiated after a predefined number of translations of the resin support.

* * * * *